BROADCAST PAGING SYSTEM

Filed Dec. 23, 1957 6 Sheets-Sheet 1

INVENTORS.
ERNEST H. GATZERT
WILLIAM W. PHARIS
RICHARD P. BOYER, JR.
BY
AGENT

Nov. 17, 1959 E. H. GATZERT ET AL 2,913,533

BROADCAST PAGING SYSTEM

Filed Dec. 23, 1957 6 Sheets-Sheet 2

CALLING CONNECTOR

Nov. 17, 1959 E. H. GATZERT ET AL 2,913,533

BROADCAST PAGING SYSTEM

Filed Dec. 23, 1957 6 Sheets-Sheet 3

ANSWERING CONNECTOR

Nov. 17, 1959 E. H. GATZERT ET AL 2,913,533

BROADCAST PAGING SYSTEM

Filed Dec. 23, 1957 6 Sheets-Sheet 5

United States Patent Office 2,913,533
Patented Nov. 17, 1959

2,913,533

BROADCAST PAGING SYSTEM

Ernest H. Gatzert and William W. Pharis, Rochester, and Richard P. Boyer, Jr., Irondequoit, N.Y., assignors to General Dynamics Corporation, Rochester, N.Y., a corporation of Delaware Application December 23, 1957, Serial No. 704,487

29 Claims. (Cl. 179—18)

This invention relates to paging systems in general and more particularly to paging systems of the so-called "meet me" type.

A "meet me" paging system usually includes a first subsystem having a common signaling transmitter for signaling the required one of a plurality of stations within the subsystem. Selective control of the signaling transmitter may be effected by means such as an operator position or a subscriber controlled termination accessible from a dial telephone system. After having caused the transmitter to be selectively operated, the paging or calling party and the paged or called party at the required first subsystem station use a second subsystem for extending connections from ones of a plurality of second subsystem stations to a common point in order to complete a connection between paging and paged parties. The usual connection provides for transmitting information in both directions. While such connections usually include a speech transmission channel, other modes of information transmission could be employed. Further, while such systems usually include separate and distinct first and second subsystems, our invention is directed to also include a communication system in which the first and second subsystems may take the form of first and second special use equipments within the same overall communication system.

When the above-referred to second subsystem takes the form of a dial telephone system, it is the usual practice to combine the first subsystem transmitter control equipment with the two-way connection access equipment in order to save apparatus and to minimize the number of operations to be carried out by a calling party required to complete a paging call. If such a system is adapted to handle only one paging call at a time, access termination is made accessible at a first calling point from telephone system switching equipment. The switching equipment responds in the conventional manner to directive impulse trains from the calling line used by the paging party to establish a connection from the paging party station to the access termination. The access termination is thus seized and thereafter is responsive to further trains of directive impulses effective to control the first subsystem signal transmitter. The paged party, upon receiving a signal at the first subsystem station, takes up any telephone within the second subsystem and extends a connection in the conventional manner into a second, answering, point on the access termination. The extension of the last-mentioned connection is effective for causing the termination to complete a connection between the talking channels of the first and second termination access points, so that the paging and paged parties are connected to each other over a two-way communication channel.

While the simple system outlined above is practical to effect one paging call at a time, it is obvious that a system of greater capacity would be desirable. However, when the above-outlined system is expanded to provide for extending two or more calls at any one time, it is necessary to provide in the access equipment signal storage apparatus capable of recording the identity and access point of the calling party and the identity of the first system station. The stored information is later used upon the completion of the called party's connection to the answering access point for directing auxiliary switching apparatus to complete a connection between the desired paging and paged parties. Such apparatus is necessarily complex, and further, a way must be found to identify a paged party upon the completion of the second subsystem connection to the signal storage equipment. The latter requirement, at best, complicates the operation of the paging system from the subscriber's point of view.

Accordingly, it is an object of our invention to provide a new and improved paging system.

Another object of our invention is to provide a new and improved paging system of the "meet me" type.

Another object of our invention is to provide a new and improved paging system wherein a private connection may be established between paging and paged parties.

Another object of our invention is to provide a new and improved paging system wherein a private connection between several pairs of paging and paged parties may be established at any one time.

Another object of our invention is to provide in a paging system a new and improved apparatus for responding to alarm or malfunction conditions within the paging system.

We accomplish these and other objects of our invention by providing a communication system having first and second subsystems. The first subsystem includes a common signal transmitting device such as a wireless transmitter and a plurality of receiving stations. Each of the first subsystem stations is assigned a unique directory number comprising one or more digits. This first subsystem may be of the same general type as the one described in patent application Serial No. 432,517, filed May 26, 1954, by John R. Scantlin and assigned to the same assignee as the present invention. The signal transmitting device is selectively operable for signaling any one of the receiving stations. The second subsystem includes a dial type telephone system. The telephone system has an office comprising switching equipment capable of the conventional use of extending connections between calling and called ones of a plurality of lines upon the manipulation of a dial or other signal transmitting device at the telephone station connected to the calling line.

In our system, a person wishing to page any one of the first subsystem stations, picks up a second subsystem telephone, dials a special access (calling) code and thereafter dials the directory number of the required first subsystem station. The office switching equipment has access to special equipment for controlling the first subsystem transmitter.

The special apparatus includes a first plurality of calling connectors and a second plurality of answering connectors. Each special apparatus connector has access to a plurality of terminal sets, the terminal sets accessible to each connector being connected in multiple to corresponding terminal sets accessible from the other connectors. Certain ones of each multipled terminal set are used for a speech transmission channel. The dial office apparatus is arranged so that when the party wishing to page dials the calling access number, a switch train is directively operated to select an idle one of the calling connectors. Thereafter, when the calling party dials the directory number of the required first subsystem station, the selected connector is directively operated to extend a connection from the calling line through the switch train including the selected one of the calling connectors to a particular one of the terminal sets, and, therefore, to a particular speech transmission channel. The calling station and line, and the office switching equipment, therefore, may be considered calling means for directively operating any one of the calling connectors.

The paged or called party at the signaled first subsystem station having been notified, by the use of the first subsystem in a manner to be described presently, that a paging party wishes to communicate with him, picks up an idle second subsystem telephone and dials another special access (answering) number and thereafter dials the directory number of his own first subsystem station. Dialing the answering access number causes another dial office switch train to be directively operated to select an idle one of the answering connectors. Thereafter, when the paged party dials further directive digits representing the directory number of the first subsystem, paged station into the selected answering connector a connection is extended over the switch train including the selected one of the answering connectors from the paged party's station to the terminal set corresponding to the one selected by the operated calling connector, and, therefore, to the one of the speech transmission channels previously selected by the calling connector. Thereafter, conversation between the paging and paged parties takes place. Assuming that there are more sets of terminals accessible to each switch than the number of switches in either of the pluralities, it is thus possible to establish as many conversations between the calling and paged parties as there are pairs of calling and answering connectors.

In addition to its above-described function of establishing a connection between the second subsystem stations, the calling connector is effective for causing start means within an encoder control common to the plurality of calling connectors to energize certain ones of the non-speech transmission channel terminals within the set selected by the calling connector. These other terminals within each set are unique to one of the plurality of first subsystem stations and when energized, are effective for selectively operating decoding means in accordance with the identity of this selected terminal set. The decoding means in turn is effective for selectively controlling the signal transmitting means within the first subsystem transmitter.

The transmitter includes means operative in response to a complete operation of its own signal transmitting means for operating end-of-cycle means. The operated end-of-cycle means is effective for causing means within the encoder control means to deenergize the selected one of the terminal sets in order to stop further operation of the transmitter. The encoder control means is then available for use by other of the calling connectors as the demand for the service of the encoder control means arises. With this arrangement, several of the calling connectors can sequentially control the first subsystem transmitter within any given time interval.

In the following description, reference is made to the drawings attached to and forming a part of the present specification, and in which.

Figures 4A, 4B:
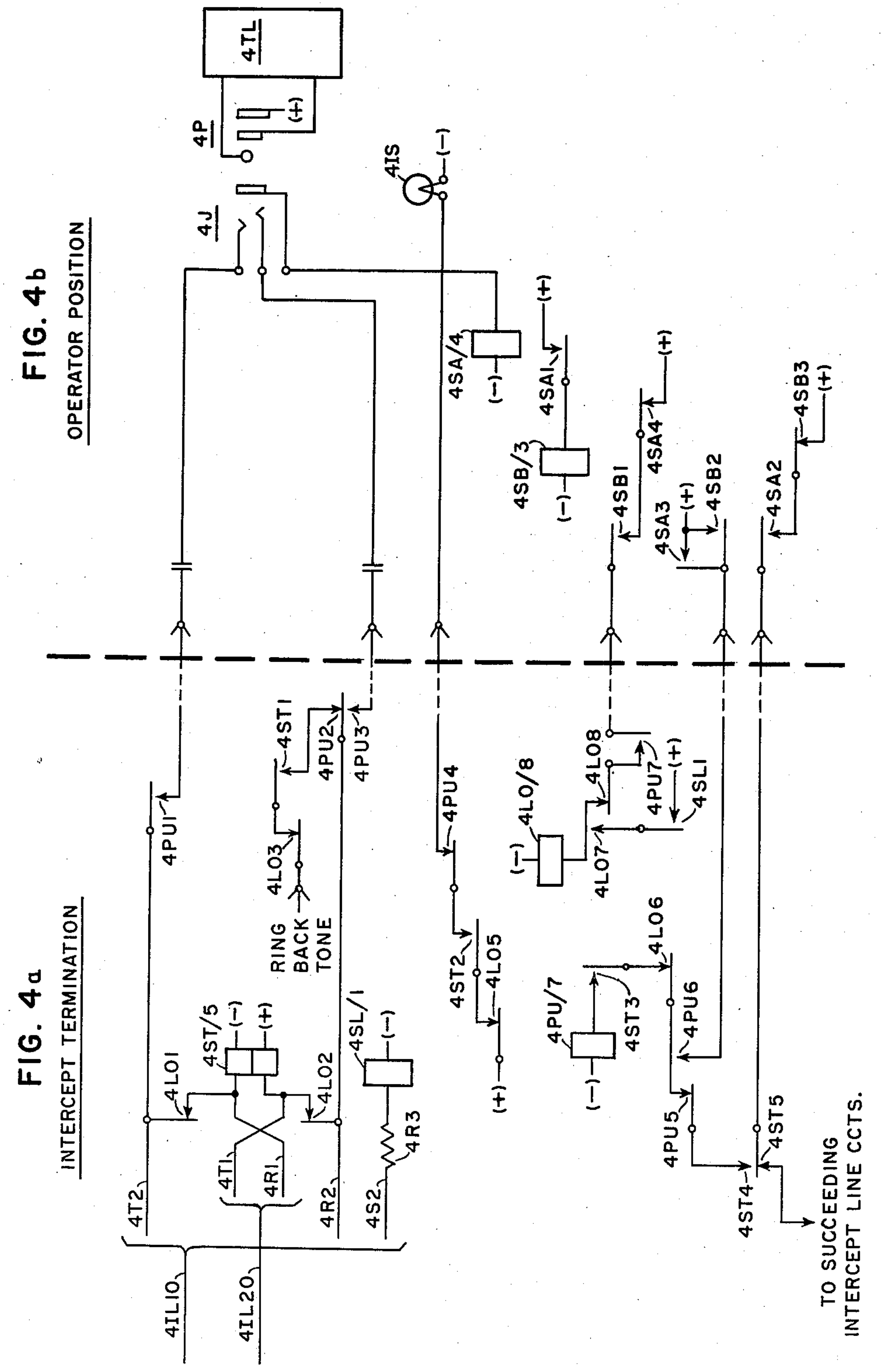
Figure 6:
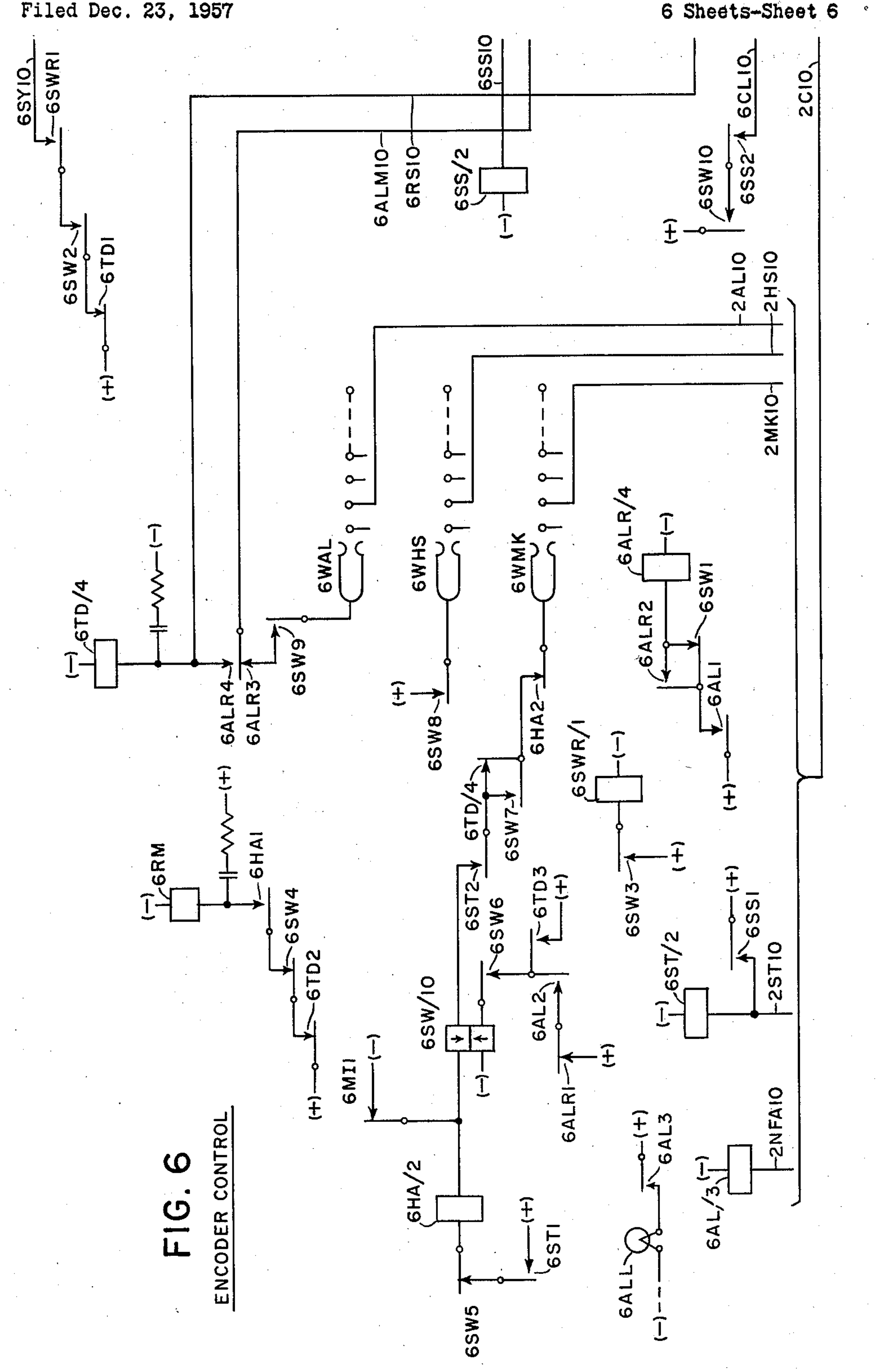

Figs. 4*a* and 4*b* show schematic diagrams of an intercept termination and an intercept answering device, respectively;

Figs. 5*a*–5*f* show schematic diagrams of the decoding matrices and encoder transmitter, and diode sets;

Fig. 6 shows a schematic diagram of the encoder control; and

Figures 1, 7:
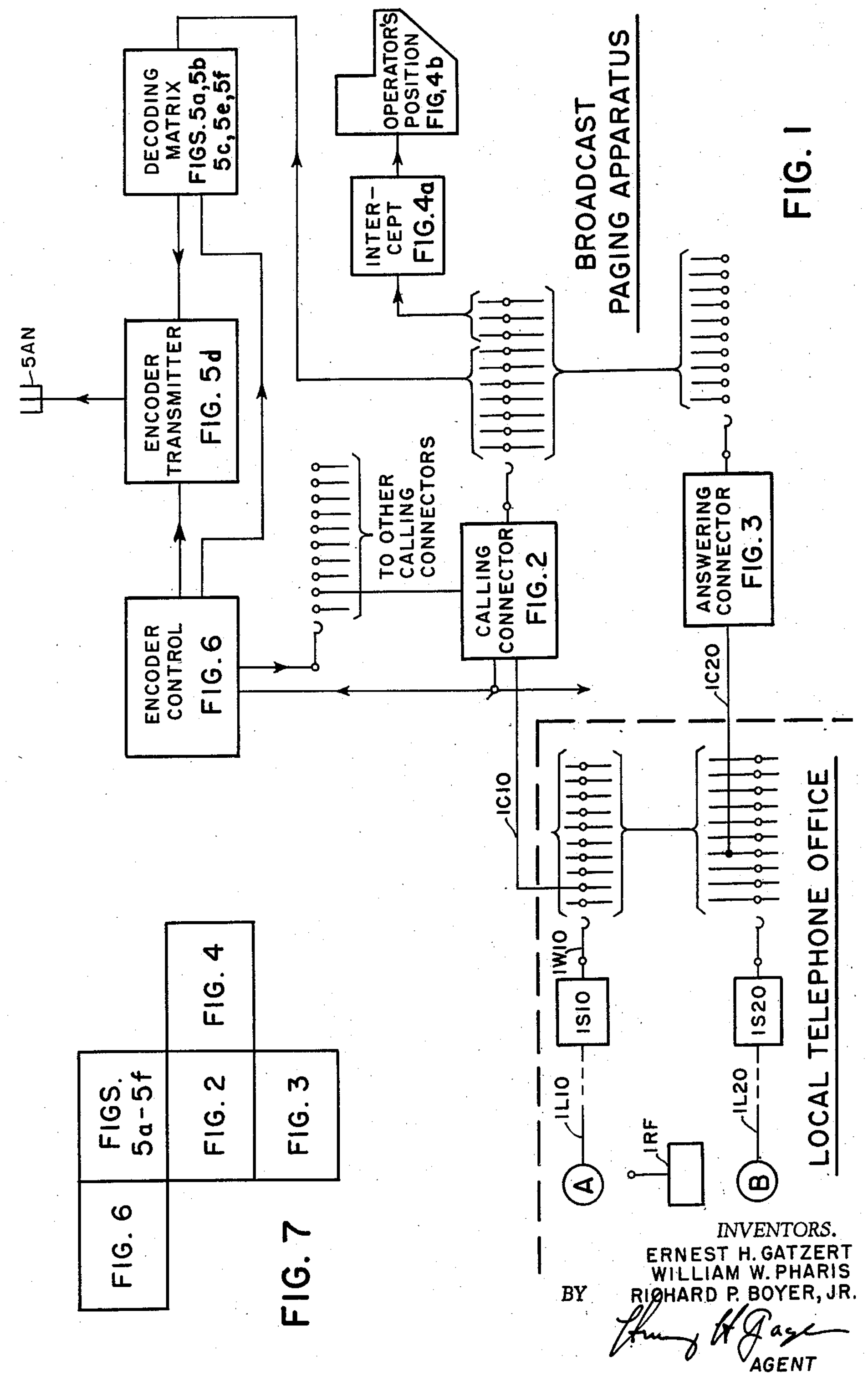
Fig. 1 shows a block diagram of the system.

Fig. 7 shows the order in which Figs. 2–6 are to be oriented.

Our system comprises first and second subsystems. The first subsystem includes a plurality of stations and a transmitter common to the stations of the general type described by John R. Scantlin in a patent application filed May 26, 1954, Serial No. 432,517, and assigned to the same assignee as the present invention. The transmitter is selectively operable in a manner to be described for signaling any station within the system.

The apparatus in the following description of our invention is made to function from power supplied from various sources. A first power source is a battery having its most positive plate or terminal connected to ground. This plate is hereafter referred to as "ground" in the description and as (+) in the drawings. The other, most negative plate or terminal of the battery is referred to in the description as "battery" and in the drawings as (−). Another power source is low impedance tone supply which produces a four hundred cycle per second signal. One side of the source is connected to the above-referred to ground, the other, ungrounded side being indicated as "dial tone" in both the drawings and description. The ungrounded tone supply conductor is also passed through an interrupter circuit of the well-known type and is delivered on a conductor indicated as "busy tone" both in the description and drawings at a frequency of 60 impulses per minute. The interrupter is also used for producing interrupted battery and ground signals, labeled "60 impulses per minute" or as required. Another tone source having a first, grounded side, and a second, ungrounded side which is passed through the interrupter, provides an interrupted 20 cycle per second signal hereinafter referred to in the description and drawings as "ringback tone."

In the following description, reference to apparatus shown in the drawings includes a single digit followed by an identifying letter or letters and digits. The prefix digit refers to the figure number in which the element is found, while the letters identify the element within the figure. The windings of multicontact relays are identified as indicated above and are followed by a slash and an additional digit or digits indicating the number of contacts on the relay. Thus, "2CB/2" refers to the calling bridge relay having two sets of contacts appearing in Fig. 2, and "2CB1" refers to a particular set of contacts on relay 2CB.

*Originating a paging call*

Referring to Fig. 1, a first subsystem comprising a conventional local, dial telephone office is indicated. The office has a plurality of lines such as 1L10 and 1L20 connected thereto. Stations, such as A and B, respectively, are connected to each of the lines. To originate a call from a line such as 1L10, the telephone at station A is removed from its hookswitch, and thereafter a connection is extended by conventional methods to switching equipment within the office such as selector 1S10. The selector is thereupon directively operated by manipulating a dial at station A so that the selector's wiper set shown collectively as 1W10 is directively advanced into engagement with one of a plurality of terminal sets accessible from the selector. The office switching equipment is not described in detail here because its operation is well understood by those skilled in the art, and because the office switching equipment per se does not form a part of our invention.

Figure 2:
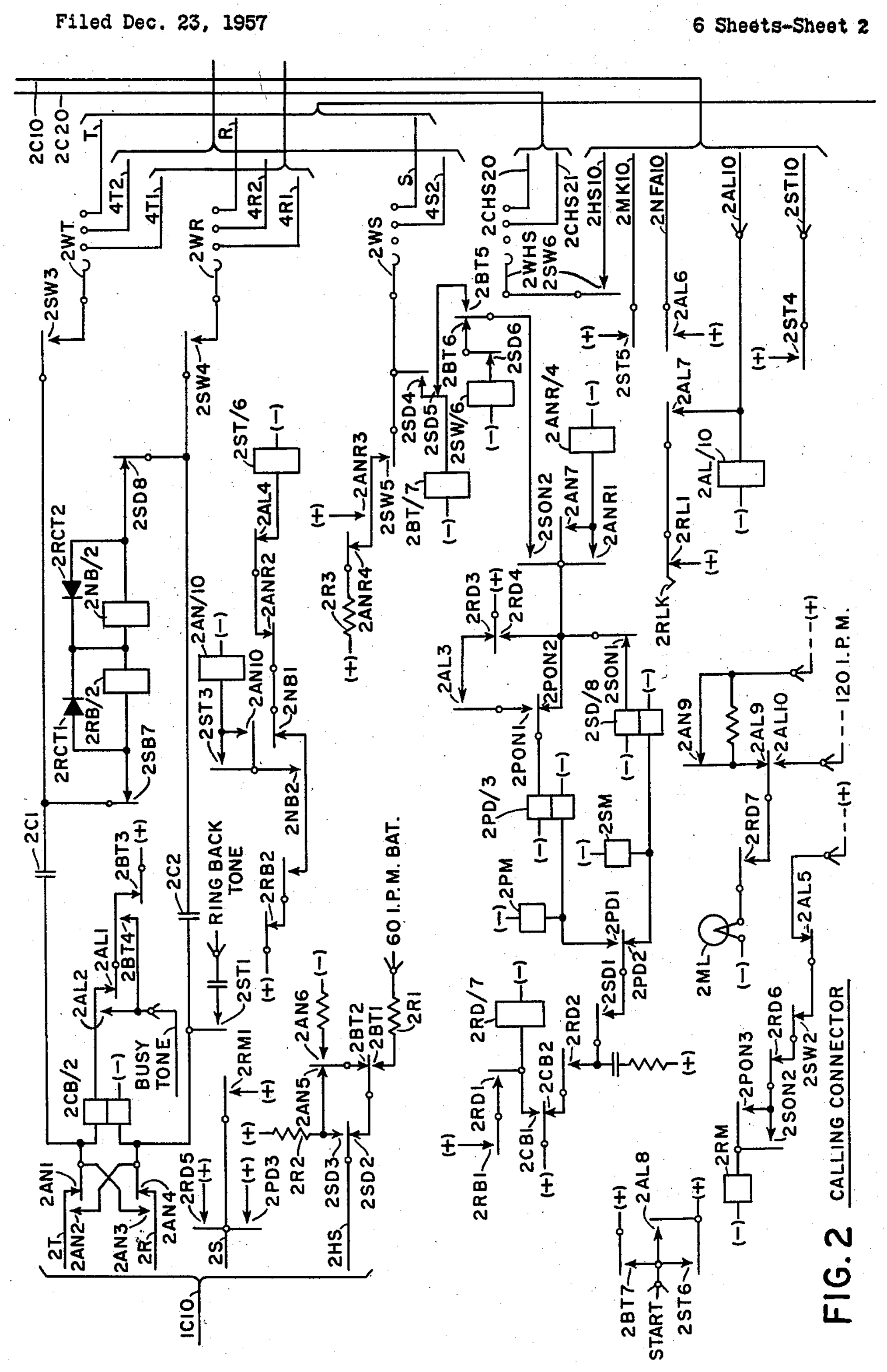
Fig. 2 shows a schematic diagram of an incoming paging connector.

Assuming that the person at station A on calling line 1L10 wishes to make a paging call, the signal transmitter at station A is manipulated so that selector 1S10 is directed to a particular level wherein a first plurality of special switching connectors, such as the calling connector shown in Fig. 2 are terminated. The conductors, such as those shown collectively as 1C10, incoming to each calling connector are terminated on one of the terminal sets within the special level. Upon the selection of the particular level, the wiper set 1W10 of selector 1S10 is automatically advanced over the terminal sets within the level until the wiper set engages the terminal set of an idle calling connector. Assuming that the one shown in Fig. 2 is the first idle connector encountered, seizure of that connector thereafter takes place in the manner next described.

*Seizure of a calling connector.*—Referring to Fig. 2, the extension of a connection to an idle connector such as the one shown in Fig. 2 is effective for completing a talking channel from the conductors on line 1L10 to the talking channel of the calling connector which includes conductors 2T and 2R. The conventional short including the dial interrupter contacts between the conductors of line 1L10 at station A is effective for completing an operating circuit for calling bridge relay 2CB. The circuit is traced from ground through break contacts 2BT3 and 2AL1, the upper winding of relay 2CB, break contacts 2AN1, conductor 2T, the corresponding conductors through selector 1S10 and line 1L10, apparatus including the impulsing dial contacts of station A, the other talking conductors of line 1L10 and selector 1S10, conductor 2R, break contacts 2AN4, and the lower winding of relay 2CB to battery. Relay 2CB thereupon operates to complete an obvious operating circuit for release delay relay 2RD at make contacts 2CB1.

The operation of relay 2RD is effective for preparing a holding circuit for itself at make contacts 2RD1. The operation of relay 2RD is further effective for preparing an energizing circuit for each of the primary and secondary advancing means of the connector comprising primary magnet 2PM and second magnet 2SM, respectively, at make contacts 2RD2. The operation of relay 2RD is further effective for placing a holding and busy marking ground on sleeve conductor 2S incoming conductors to the calling connector at make contacts 2RD5. Thereafter, the preceding switch train including selector 1S10 is held and the calling connector of Fig. 2 is marked busy in the conventional manner by virtue of the grounded 2S conductor.

The operation of relay 2RD is further effective for opening the subsequently described operating circuit for release magnet 2RM at break contacts 2RD6. The operation of relay 2RD is further effective for completing an energizing circuit for monitor lamp 2ML from ground through break contacts 2AN9 and 2AL9, make contacts 2RD7, and the filament of lamp 2ML to battery. Lamp 2ML thereupon flows in full brilliance to indicate that a call is standing in on the connector.

The operation of relay 2RD is further effective for operating primary and secondary delay relays 2PD and 2SD, respectively. The operating circuit of relay 2PD is traced, from ground through the contacts 2RD4, break contacts 2PON2, and the upper winding of relay 2PD to battery. Relays 2PD and 2SD thereupon operate.

The operation of relay 2PD is effective for completing an auxiliary ground supply circuit for incoming sleeve conductor 2S at make contacts 2PD3 for reasons to be set forth under the description of the interrupt operation. The operation of relay 2PD is further effective for preparing an operating circuit for primary magnet 2PM at make contacts 2PD1 and for operating an energizing circuit for secondary magnet 2SM at breach contacts 2PD2.

*Advance of the calling connector in its primary direction.*—The seizure process of the calling connector is now completed, and the connector is ready to receive trains of directive impulses from calling station A over incoming conductors 2T and 2R. Each impulse in such a train is caused by the conventional opening and reclosing of the impulsing dial contacts at the station. As a result, the above-described circuit for operating relay 2CB is opened and reclosed and relay 2CB releases and reoperates in response to each such impulse. At the conclusion of each impulse train, relay 2CB comes to rest in its operated condition. Relay 2RD, a slow release type, does not release during the time that impulses are being released by relay 2CB, even though the above-described operating circuit of relay 2RD is momentarily opened at make contacts 2CB1.

During the transmission of a first train of impulses to the calling connector, that is during the time that both relays 2PD and 2SD are operated, a circuit is completed upon each release of relay 2CB for energizing means for advancing the wiper set of the connector comprising wipers 2WT, 2WR, 2WS and 2WHS away from their normal position in a primary direction. The energizing circuit is completed from ground through break contacts 2CB2, make contacts 2RD2, 2SD1, and 2PD1, and the winding of magnet 2PM to battery. The battery-connected lower winding of relay 2PD is connected in parallel with magnet 2PM, so that the lower winding of relay 2PD is intermittently energized during the receipt of impulses at magnet 2PM.

Each energization of magnet 2PM is effective for advancing the above-referred to wiper set one additional step away from its normal position. At any one of the advanced positions, the wiper set is opposite a corresponding level of the plurality of terminal sets to which the connector has access. The advance of a wiper set in its normal direction is further effective for operating the primary off-normal springs of the connector, so that the above-referred to energizing circuit for relay 2PD is opened at break contacts 2PON2. Thereafter relay 2PD, a slow release type, is maintained in its operated condition by the intermittent energization of its lower winding in the above-described manner. This intermittent energization of the lower winding stops upon receipt of the last impulse of the first train, so that relay 2PD thereafter releases. At this point, the wiper set has come to rest opposite the selected level of terminal sets.

The release of relay 2PD is effective to prepare the connector to receive a second train of directive impulses from the calling line. To this end, the release of relay 2PD is effective for disconnecting magnet 2PM and the lower winding of relay 2PD from the above-described impulsing circuit at make contacts 2PD1 and for preparing a circuit for energizing secondary magnet 2SM at break contacts 2PD2.

*Advance of the calling connector in its secondary direction.*—Upon the transmission of a second impulse train to the connectors, relay 2CB is again impulsed in its previously described manner and is effective for energizing secondary advancing means comprising magnet 2SM. The magnet is energized upon each release of relay 2CB over the following circuit: from ground through break contacts 2CB2, make contacts 2RD2 and 2SD1, and break contacts 2PD2, and the winding of magnet 2SM to battery. The battery connected to the lower winding of relay 2SB is connected in parallel with magnet 2SM, so that the lower winding of the relay is intermittently energized during the transmission of the second impulse train to the connector.

Each energization of magnet 2SM is effective for advancing the above-referred to wiper set away from its normal secondary position into engagement with successive ones of the contacts in the selected one of the levels. Thus, at the end of transmission of the second impulse train, the wiper set comes to rest in engagement with a selected terminal set within the selected level. Each terminal set within the plurality of sets accessible to each calling connector, such as the one shown in Fig. 2 includes first and second talking channel terminals (to be engaged by wipers such as 2WT and 2WR), a busy test terminal (to be engaged by a wiper such as 2WS) and a signaling terminal (to be engaged by a wiper such as 2WHS).

Upon the first step of the wiper set away from its normal secondary position, secondary off-normal means comprising contacts are operated in order to open the above-traced operating circuit for relay 2SD at break contacts 2SON1. During the transmission of impulses, relay 2SD, a slow release type, is maintained operated by virtue of the above-described intermittent energization of its lower winding. After the receipt of the second impulse train, the above-described energizing circuit for magnet 2SM is final and the lower winding of relay 2SD is deenergized. Relay 2SD thereafter releases.

*Busy test.*—In order to prevent more than one of the plurality of calling connectors from seizing a given terminal set, means is provided in each calling connector for testing for busy condition on a selected terminal set. If the busy testing means fails to operate, other, switchthrough means within the connector is subsequently operated. The busy test is next described.

To any of the plurality of calling connectors being considered here, a busy condition on a terminal set is indicated by the presence of a first or second marking signal on the busy test terminal of the selected set. The first and second marking signals are (1) ground through any resistance up to the value of 1,000 ohms and (2) direct ground, respectively. Accordingly, when the second impulse train has been received and the wiper set has engaged a particular terminal set, a test operation of the engaged terminal set is carried out during the time that relay 2SD is still in its operated condition. When relay 2SD is operated, a circuit for operating busy test relay 2BT is prepared from battery through the winding of relay 2BT, make contacts 2SD4, and wiper 2WS to the engaged terminal. In the event that direct or resistance ground is present on the terminal engaged by wiper 2WS, relay 2BT operates. Thereafter, relay 2SD releases in the previously described manner and is effective in response to the operation of relay 2BT for completing a locking circuit for relay 2BT from ground through make contacts 2RD4, secondary off-normal contacts 2SON2, and 2BT5, break contacts 2SD5, and the winding of relay 2BT to battery.

The operation of relay 2BT is effective for connecting busy tone to the calling line 1L10 from busy tone through make contacts 2BT4, break contacts 2AL1, and the upper winding of relay 2CB to conductor T2 and thence to line 1L10. The party at station A, upon hearing the tone, is informed that he should return his telephone to its hookswitch so that the switch train may be released in a manner to be described presently. The operation of relay BT is further effective for connecting 60 IPM battery through resistor 2R1 to incoming conductor 2HS at make contacts 2BT1.

*Switchthrough.*—In the event that the terminal set engaged by the wiper set in the above-described manner fails to test busy, relay 2BT remains in its normal condition. Upon release of relay 2SD in the previously described manner, a circuit is thereupon completed for operating switchthrough relay 2SW which is traced over the following circuit: from ground through make contacts 2RD4 and 2SON2, break contacts 2BT6 and 2SD6, and the winding of relay 2SW to battery. Relay 2SW thereupon operates.

The switchthrough means comprising relay 2SW is effective for extending a connection from the incoming talking channel comprising incoming conductors 2T and 2R (to which the first calling line 1L10 has been connected) to the aforementioned talking channel terminals of the terminal set engaged by wipers 2WT and 2WR at make contacts 2SW3 and 2SW4. Blocking capacitors 2C1 and 2C2 are interposed between the incoming talking channel conductors and the wipers in order to separate the signaling channels including the talking conductor of the incoming end of the connector from the corresponding signaling channel at the outgoing end of the connector.

The operation of relay 2SW is further effective for marking the selected terminal set in a first particular manner, that is, by applying ground through 1,000 ohms to the one of the terminals in the selected set engaged by wiper 2WS. This circuit is traced from ground through 1,000 ohm resistor 2R3, break contacts 2ANR4, make contacts 2SW5, and wiper 2WS to the terminal. This 1,000 ohm ground has the effect of marking the terminal set and its corresponding multiply connected terminal sets accessible to other calling connectors busy to other calling connectors within the above-referred to first plurality and for marking the terminal sets multiply connected thereto and accessible to answering connectors such as the one shown in Fig. 3 included in a second plurality as available. The operation of relay 2SW has the further effect of connecting conductor 2HS10, which is incoming from the common encoder control circuit shown in Fig. 6, to the one of the terminals engaged by wiper 2WHS at make contacts 2SW6. The effect of this connection is to be explained presently.

The operation of relay 2SW is further effective for operating start relay 2ST over a circuit which is traced from ground through break contacts 2RB2, make contacts 2SW1, break contacts 2NB1, 2ANR2, and 2AL4, and the winding of relay 2ST to battery. Relay 2ST thereupon operates. The operation of relay 2ST marks the last step in the process of seizing the selected one of the terminal sets and is effective for starting the operation of the above mentioned encoder control circuit which is next described.

*Operation of the encoder control*

Referring to Fig. 1, means including the above mentioned encoder control circuit shown in Fig. 6 is common to the plurality of the calling connectors such as the ones shown in Fig. 2 and is effective in the manner presently set forth for energizing certain of the ones of the non-talking terminals selected by an operated one of the calling connectors. Upon the completion of the seizure of any one of the terminal sets to which the calling connectors have access, the seizing one of the connectors places a demand signal on the encoder control circuit, thereby causing a switch within that circuit to seize the terminal set on which are terminated conductors such as 2HS10, 2MK10 and 2HFA10 incoming to individual ones of the calling connectors.

*Starting the encoder control switch.*—Upon the operation of relay 2ST10 within the seizing one of the calling connectors, a demand signal in the form of a ground connection is placed on the common start lead 2ST which extends to contacts corresponding to 2ST4 within all calling connectors at make contacts 2ST4. The application of ground to conductor 2ST10 is effective for energizing means comprising start relay 6ST for making the encoder control operative by completing an obvious circuit for start relay 6ST within the encoder control.

The operation of relay 6ST is effective for starting means comprising a single motion switch in operation by completing an operating circuit for hunt assist relay 6HA as follows: from ground through make contacts 6ST1, break contacts 6SW5, the winding of relay 6HA, and break contacts 6MI1 to battery. Relay 6HA thereupon operates with effects to be explained presently. The operation of relay 6ST is also effective for preparing a circuit for energizing switchthrough relay 6SW as follows: from battery through switch interrupter break contacts 6MI1, the upper winding of relay 6SW, make contacts 6ST2, break contacts 6TD4 and 6HA2, and wiper 6WMK.

The above referred to single motion switch within the encoder control is of the well-known rotary type having a set of wipers including 6WAL, 6WHS, and 6WMK, which may be advanced over first, second and third banks, respectively, of terminal sets. The switch is operated on a self-interrupting basis until the wiper set has been advanced into engagement with the terminal set on which are terminated the conductors incoming to the one of the calling connectors demanding service. To this end, upon the operation of relay 6HA, a circuit is completed for energizing rotary magnet 6RM of the switch over the following circuit: from ground through break contacts 6TD2 and 6SW4, make contacts 6HA1, and the winding of magnet 6RM to battery. Magnet 6RM operates to open its own interrupter contacts 6MI1 and thereby release relay 6HA. Upon release of relay 6HA, the above traced circuit for preparing relay 6SW is completed at break contacts 6HA2, and the above traced operating circuit for magnet 6RM is opened in order to deenergize that magnet. The deenergization of magnet 6RM is effective for advancing the wiper set of the rotary switch into engagement with the next succeeding terminal set in the banks.

This process is repeated until the wiper set is moved into engagement with the terminal set individual to the calling connector demanding service. The latter set is characterized by the connection of ground to the marking conductor from the calling connector circuit, in the case being considered here, conductor 2MK10. Ground received over wiper WMK serves as a stop signal for the encoder control switch.

*Stopping the encoder control switch.*—The engagement of wiper 6WMK of grounded 2MK10 is effective upon the next occurring release of relay 6HA for completing a circuit for operating switchthrough relay 6SW over the above traced circuit including the upper winding of relay 6SW. Relay 6SW operates to mark the end of the hunting operation of the rotary switch. Accordingly, the operation of relay 6SW is effective for opening the above traced operating circuit for magnet 6RM at break contacts 6SW4 in order to prevent the magnet from being reenergized. Similarly, the operation of relay 6SW is effective for opening the energizing circuit for relay 6HA at break contacts 6SW5 in order to release relay 6HA. Thereafter, neither relay 6HA nor magnet 6RM can be energized until a dismiss signal is received by the encoder in a manner to be described presently.

The operation of relay 6SW is further effective for preparing a release circuit for itself including the lower winding of battery at make contacts 6SW6. The operation of relay 6SW is further effective for completing an obvious operating circuit for switchthrough repeater relay 6SWR at make contacts 6SW3. Relay 6SWR, a slow operate type, operates at some time thereafter with effects to be explained presently. The operation of relay 6SW is further effective for opening an operating circuit for alarm repeater relay 6ALR at break contacts 6SW1. The operation of relay 6SW is further effective for completing a holding circuit for itself including the upper winding and wiper 6WNK at make contacts 6SW7. The operation of relay 6SW is further effective for preparing a circuit for energizing wiper 6WAL at make contacts 6SW9. The operation of relays 6SW and 6SWR is effective for transmitting a ground signal over conductor 6SY10 to the decoding matrices by connecting ground to that conductor through break contacts 6TD1, make contacts 6SW2, and 6SWR1 for purposes to be explained presently. Finally, relay 6SW is included in start means operative for transmitting a signal for energizing one of the non-talking pair of terminals of the set selected by the presently engaged one of the calling connectors from ground through make contacts 6SW8, wiper 6WHS, conductor 2HS10, and, within the operated one of the calling connectors, make contacts 2SW6 and wiper 2WHS to the one of the terminals of the selected set engaged by wiper 2WHS.

*Selective operation of the encoder transmitter*

Referring to Fig. 1, it has been seen thus far that upon the selection of a particular terminal set by one of the calling connectors such as the one shown in Fig. 2, the encoder control of Fig. 6 is caused to transmit a signal through the operated one of the calling connectors to energize the one of the terminals engaged by wiper 2WHS. Each multiply connected terminal available to a wiper 2WHS of any calling connector is individual to one of a plurality of radio frequency receivers within a different subsystem. The subsystem including the calling connectors is accordingly arranged so that the energization of any one such terminal is effective for controlling a radio-frequency transmitter, shown in block form in Fig. 5*d*, common to the plurality of calling connectors in such a manner that the transmitter signals the radio frequency receiver corresponding to the selected terminal. To this end, each multiply connected transmitter controlling terminal is connected individually to the positive side of a set of gating diodes, such as the ones shown in Fig. 5*e*, individual to that terminal. The other side of each diode within each set is individually connected to a certain one of a plurality of inputs of a corresponding decoding matrix. Thus, the negative sides of diodes 5D1, 5D2, and 5D3 are connected to ones of the input conductors of the decoding matrices shown in Figs. 5*a*, 5*b*, and 5*c*, respectively. With this arrangement of elements, the energization of any one terminal accessible to a 2WHS wiper of any one of the calling connectors is effective for energizing a unique combination of matrix input conductors. In the case chosen for illustration here, it is assumed that wiper 2WHS has been advanced to engage the one of the terminals to which conductor 2CHS20 is connected.

Of the various sets of decoding matrix relays, only decoding matrix A is shown in any detail because decoding matrices B and C are substantially identical in function. In the contemplated system, it is necessary to energize one and only one input of each matrix in order to control the encoder-transmitter of Fig. 5*d*. The energization of less or more than this number of inputs gives rise to an alarm condition, with results which are presently described.

Figures 5A, 5B, 5C, 5D, 5E, 5F:
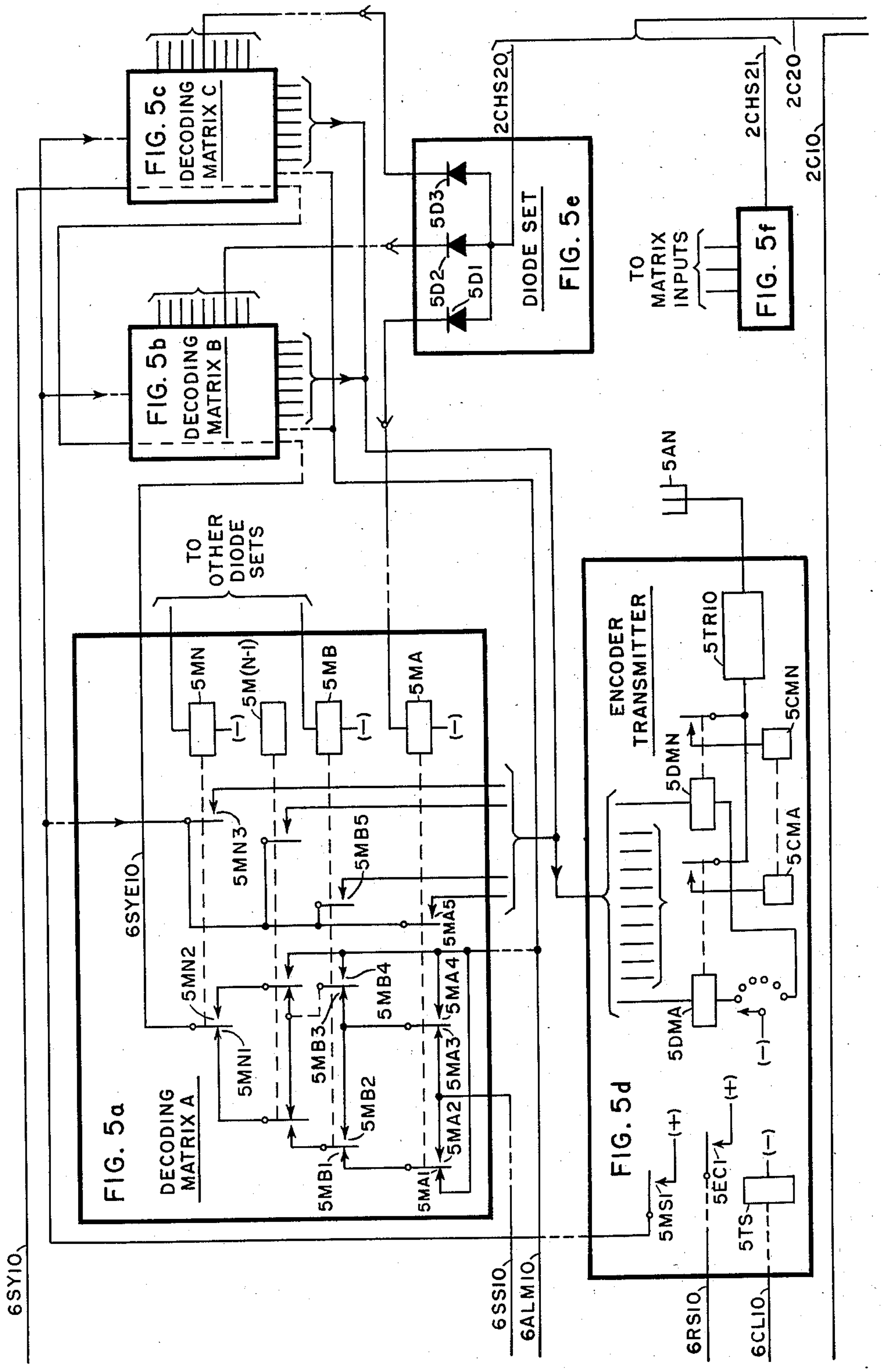

Upon the energization of conductor 2CHS20 in the above described manner, one of the relays in each matrix is operated. In the illustrated case, relay 5MA within decoding matrix A is operated over an obvious circuit. No other relay in matrix A is to be operated at this time. Similarly, appropriate relays within matrices B and C operate at this time. The operation of one and only one relay in each of matrices A, B and C, a circuit is effective for completing a start signal circuit to the encoder control shown in Fig. 6 and thereby operating sending start relay 6SS within the encoder control. This circuit is traced from battery through the winding of relay 6SS, conductor 6SS10, make contacts 5MA2 on now operated relay 5MA, break contacts such as 5MB1 and 5MN1 arranged in a chain as indicated in Fig. 5*a*, through conductor 6SYE10, corresponding contact sets in the decoding matrices B and C, conductors 6SY10, make contacts 6SWR1 and 6SW2, and break contacts 6TD1 to ground. Upon receipt of the ground signal at the winding of relay 6SS, relay 6SS operates to complete a locking circuit for start relay 6ST within the encoder control, so that the removal of a demand signal from conductor 2ST10 will not prevent a complete operation of the encoder transmitter. The operation of relay 6SS is also effective to indicate to the encoder control that the matrices have been operated and therefore are ready to spill information into the encoder transmitter shown in Fig. 5*d*. This operation is next described.

*Operation of the encoder transmitter*

The operation of encoder transmitter shown in Fig. 5*d* is described in general terms only because the encoder transmitter, as such, does not form a part of our invention. Upon the operation of sending start relay 6SS in the above described manner, a circuit is completed for transmitting a start signal to the encoder transmitter from ground through make contacts 6SW10 and 6SS2, conductor 6CL10 to the encoder transmitter, and is effective for energizing means such as encoder transmitter start relay 5TS over an obvious circuit.

Thereafter, means such as contacts 5MS1 are operated in response to the operation of relay 5TS and is effective for transmitting a signal over conductor 5MS10 to the decoding matrices for making the decoding relays in the various matrices effective to spill the stored information (i.e., the identity of the one of the radio frequency receivers to be signaled) into selective controlling means.

As previously pointed out, one of the decoding relays in each of matrices A, B and C is operated upon the registration of the identity of the terminal set selected by the calling connector. Each matrix has a plurality of output leads, one of which is to be energized upon the energization of the corresponding decoding relays. Each output conductor in each matrix is multiply connected to the corresponding conductor in each of the other matrices and to a corresponding plurality of input conductors to encoder transmitter *5d*. Accordingly, when all matrices have been energized in the above described manner, a unique combination of three output conductors is energized. The input conductors of the matrices are connected to translating means such as the winding of a series of decoding relays 5DMA through 5DMN. Other means such as sequence switch 5SS10 is used for sequentially connecting battery to the other side of the winding of each decoding relay. Switch 5SS10 is made operative by means not shown to scan each decoding relay once upon each start signal sent to the encoder transmitter. With this arrangement the decoding relays within the encoder transmitter corresponding to the operated ones of the matrix relays are operated in sequence. The decoding relays are effective for connecting corresponding ones of a series of control means such as 5CMA through 5CMN to a control point in radio frequency transmitter 5TR10. Transmitter 5TR10 is thereupon selectively operated to transmit a coded signal from antenna 5AN to all radio frequency receivers within the first subsystem. The transmitted signal, however, is unique to the receiver of the paged party. It is the energization of unique combinations of matrix output conductors which causes encoder transmitter to be selectively energized in order to transmit a particular signal train.

In the illustrated case, it is assumed that the signal transmitted from antenna 5AN upon the selective energization of encoder transmitter shown in Fig. *5d* is effective for selectively signaling station 1RF, shown in Fig. 1. Upon receiving the signal unique itself, means at receiving station 1RF is effective for informing the party at that station that a paging call is standing in for his station. The paged party then uses the telephone system to complete the paging call in a manner to be described presently.

*Dismissing the encoder control*

Upon the completion of transmission of a complete radio frequency signal, means, not shown, within the encoder transmitter is effective for operating end-of-cycle means such as contacts 5EC1 which in turn are effective for transmitting a ground, end-of-cycle signal to the encoder control over conductor 6RS10. Apparatus, to be next described, is thereupon operated to release the encoder control from the one of the calling connectors demanding service and to deenergize the encoder transmitter.

The transmission of a ground, end-of-cycle signal over conductor 6RS10, an obvious circuit is completed for operating encoder dismiss relay 6TD. Relay 6TD thereupon operates. The operation of relay 6TD is effective for opening the above described circuit for operating relay 6SS at break contacts 6TD1. Relay 6SS thereupon releases with effects to be explained presently. The operation of relay 6TD is further effective for opening the previously described energizing circuit for rotary magnet 6RM at break contacts 6TD2 in order to prevent the energization of the magnet until the release process of the encoder control and encoder transmitter has been completed. The operation of relay 6TD is further effective for opening the above described operating circuit for relay 6SW at break contacts 6TD4. However, make contacts 6SW7, which are in parallel with contacts 6TD4 cause relay 6SW to continue to be operated at this time. The operation of relay 6TD is further effective for completing the previously mentioned release circuit for relay 6SW at make contacts 6TD3. As previously pointed out, relay 6SW is operated and held by virtue of current flowing through its upper winding. The release circuit for relay 6SW comprises the lower winding of relay 6SW and is effective for differentially energizing the lower winding with respect to the upper winding. The circuit is traced from ground through make contacts 6TD3 and 6SW6, the lower winding of relay 6SW to battery. Upon the differential energization of both windings of relay 6SW, relay 6SW releases with effects which are to be explained presently.

Returning to the consideration of relay 6SS, the release of relay 6SS is effective for opening the previously referred to locking circuit for relay 6ST at make contacts 6SS1. Relay 6ST thereafter remains operated only by virtue of demand signals placed on start conductor by operated ones of the calling connectors. The release of relay 6SS is further effective for removing the start signal circuit for the encoder transmitter at make contacts 6SS2, so that the encoder transmitter is deenergized.

The release of relay 6SW10 is effective for re-preparing the operating circuit for alarm repeater relay 6ALR at break contacts 6SW1. The release of relay 6SW is further effective for opening the operating circuit of relay 6SWR. Relay 6SWR thereafter releases with effects which are to be explained presently. The release of relay 6SW is further effective for re-preparing the operating circuits of magnet 6RM and relay 6HA at break contacts 6SW4 and 6SW5, respectively. The release of relay 6SW is further effective for opening the above traced release circuit and the operating and hold circuit for relay 6SW at make contacts 6SW6 and 6SW7, respectively. The release of relay 6SW is further effective for opening the above traced energizing circuit for wiper 6WHS at make contacts 6SW8. The release of relay 6SW is further effective for opening the above traced energizing circuit for wiper 6WAL and the start circuit for the encoder transmitter at make contacts 6SW9 and 6SW10, respectively.

The release of relays 6SW and 6SWR is effective for opening the above traced energizing circuit for relay 6SS at make contacts 6SW2 and 6SW1.

After the removal of the energizing signal from the encoder transmitter, the above referred to end-of-cycle means within the encoder transmitter removes ground from the winding of end-of-cycle relay 6TD at make contacts 5EC1, so that that relay may subsequently release. In the process of releasing the encoder control, 6TD is the last relay to be released owing to the fact that its winding is shunted by a high capacitance-resistance circuit also connected to battery. As a result, the reapplication of ground to the start relay 6ST winding prior to the complete dismissal of the encoder transmitter is without effect, because the operation of the rotary selecting switch is prevented until the energizing circuit for rotary magnet 6RM is recompleted at break contacts 6TD2. Similarly, relay 6SW cannot be reoperated because its operating circuit is opened at break contacts 6TD4. Similarly, relay 6SS cannot be reoperated because its operating circuit is opened at break contacts 6TD1.

The removal of ground from wiper 6WHS within the encoder control is effective for deenergizing the transmitter control terminal selected by the operated one of the calling connectors. The deenergization of the selected terminal is effective for removing the identifying signal from the inputs to the various decoding matrices, thereby releasing the operated ones of the decoding matrix relays.

If the paging call placed by the operated one of the calling connectors has been answered at this time, the encoder control is free to respond to a subsequent demand signal from a different one of the plurality of calling connectors. In the event that the paging call mentioned above has not been answered, the encoder control rotary switch is advanced in the above described manner in response to the continued presence of a demand signal on conductor 2ST10 until the switch again finds the above discussed conductor. In either event, the common encoder transmitter is again selectively energized until all paging calls have been answered, and the paged party radio frequency receiver is repeatedly energized as long as the paging party causes the calling connector used to control the encoder transmitter in operated condition.

*Answering a paged call*

As previously indicated, a paged party, upon receiving a signal at his station receiver, such as 1RF, responds by calling into the special switching equipment from any telephone in the system. In the case chosen for illustration, it is assumed that the subscriber picks up the telephone at station B and thereby causes a connection to be extended to the switching equipment such as selector 1S20 in the conventional manner. Thereafter, the selector is directively operated by manipulating the dial at station B to cause selector 1S20 to select, and thereby to extend a connection to an idle one of a second plurality of answering connectors such as the one shown in Fig. 3. Thereafter the calling station B dial is further manipulated to cause the answering selector wiper set to engage a particular one of the multiply connected terminal sets accessible to the second plurality (answering) connectors. The terminal sets accessible to the answering connectors are also multiply connected to corresponding terminal sets which are accessible from the above described first plurality (calling) connectors.

Thus far in the description no indication has been given of the exact terminals selected either by the calling and answering connectors taken by the paging and paged parties at station A and station B, respectively. This system is now explained in terms of the foregoing description. As indicated in the foregoing description, the calling connectors have access to a finite number of sets of terminals. In the contemplated system, one set of terminals is provided for each radio frequency receiver station within the above referred to first subsystem. Further, the numbers of the digits used to direct the calling and answering connectors into engagement with each terminal set correspond to the directory number of the paged, first subsystem station. Thus a paging party, wishing to contact station 32, directs the conventional switching apparatus within the office to select an idle calling connector by dialing a first (calling) predetermined access code, and upon reaching the calling connector, proceeds to dial the directory number, that is, the digits "3" and "2" of the paged party into the calling connector. Thereupon the paging party has extended a connection from his station to a talking channel including the multiply connected ones of the terminals engaged by wipers 2WT and 2WR of the calling connector. The encoder transmitter is also operated in the above described manner at this time.

The paged party, upon receiving a signal from station receiver 1RF, dials a second (answering) predetermined access code to direct the conventional switching apparatus within the telephone office to select an idle one of the answering connectors. Upon reaching the answering connector, the answering party at station B dials his own first subsystem station directory number (in this case "32") in order to advance the wiper set into engagement with the set of terminals corresponding to the ones engaged by the calling connector and to extend a talking connection from station B to the talking channel ones of the selected terminal set. Since both calling and answering connector wiper sets have been directed to corresponding, multiply connected terminal sets, a talking connection is completed between the paging and paged parties. It is obvious that within any time interval as many paging connections can be completed as there are pairs of calling and answering connectors, assuming that there are more terminal sets accessible to the connectors than there are connectors in any one plurality. The operation of the apparatus used to answer the call is next described in detail.

Figure 3:
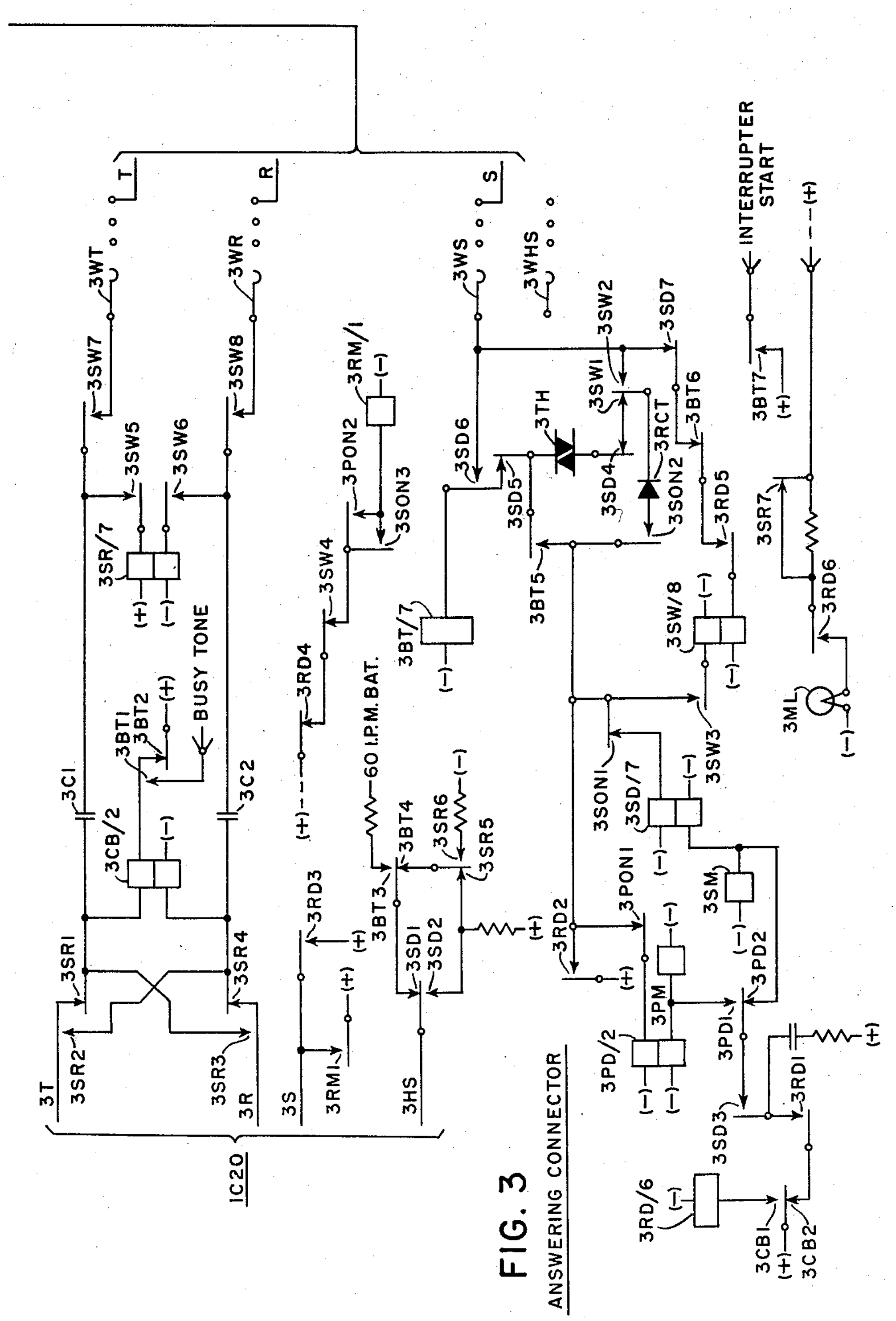
Fig. 3 shows a schematic diagram of an incoming answering connector.

*Seizing the answering connector.*—Referring to Fig. 1, it is assumed that the station telephone has been removed from its hookswitch, that a connection has been extended to selector 1S20, and that selector 1S20 has been directively operated to extend a connection from calling station B to the incoming conductors shown collectively as 1C20 of the hitherto idle answering connector shown in Fig. 3. Upon the extension of such a connection, an operating circuit for calling bridge relay 3CB is completed. The circuit is traced from ground through break contacts 3BT2, the upper winding of relay 3CB, break contacts 3SR1, conductor 3T, the talking conductors of the office switching equipment and line 1L20, the station telephone including dial contacts at station B, the other conductors of line 1L20 and selector 1S20, conductor 3R, break contacts 3SR4, and the lower winding of relay 3CB to battery. Relay 3CB thereupon operates.

The operation of relay 3CB is effective for closing an obvious circuit for operating release delay relay 3RD at make contacts 3CB1. Relay 3RD thereupon operates. The operation of relay 3RD is effective for completing a circuit for energizing monitor lamp 3ML at make contacts 3RD6. The operation of relay 3RD is further effective for preparing an operating circuit for relay 3SW at make contacts 3RD5. The operation of relay 3RD is further effective for opening the operating circuit for release magnet 3RM at break contacts 3RD4. The operation of relay 3RD is further effective for completing a circuit for grounding incoming sleeve conductor 3S at make contacts 3RD3 in order to hold the preceding switching equipment in operated condition under the control of the answering connector.

The operation of relay 3RD is further effective for preparing an impulsing circuit for primary and secondary magnets 3PM and 3SM, respectively, at make contacts 3RD1. The operation of relay 3RD is further effective for completing operating circuits for primary and secondary delay relays 3PD and 3SD. The operating circuit of relay 3PD is traced from ground through make contacts 3RD2, break contacts 3PON1, and the upper winding of relay 3PD to battery. The operating circuit of relay 3SD is traced from ground through make contacts 3RD2, break contacts 3SON1, and the upper winding of relay 3SD to battery. Both relays 3PD and 3SD thereupon operate.

The operation of relay 3PD is effective for preparing an energizing circuit for primary magnet 3PM at make contacts 3PD1, and for opening an operating circuit for secondary magnet 3SM at break contacts 3PD2. Upon the operation of relays 3PD and 3SD, the answering connector is ready to receive first and second trains of directive impulses from calling line 1L20.

*Primary advance of the answering connector.*—Relay 3CB responds to trains of directive impulses in exactly the same manner as relay 2CB described in connection with the calling connector. In response to each release of relay 3CB during the transmission of the first train of impulses, a circuit is completed for energizing magnet 3PM which is traced as follows: from ground through break contacts 3CB2, make contacts 3RD1, 3SD3, and 3PD1, and the winding of magnet 3PM to battery. Each energization of magnet 3PM is effective for advancing the wiper set of the answering connector including wipers 3WT, 3WR, 3WS, and 3WHS, one additional step away from the normal position in the primary direction of the switch.

The first step taken by the wiper set is effective for operating primary off-normal means including various spring contact sets. Thus the above described operating circuit for relay 3PD is opened at break contacts 3PON1. In order to prevent relay 3PD from releasing at this time, the lower, battery-connected winding of relay 3PD is placed in parallel with magnet 3PM. As a result, the lower winding of relay 3PD is intermittently energized during the transmission of the first impulse train to the connector. Relay 3PD is a slow release type, so that it remains operated during the time that magnet 3PM is being intermittently energized. Upon the termination of the transmission of impulses of the first train, relay 3CB comes to rest in its operated condition, thereby opening the above described energizing circuit for magnet 3PM and the lower winding of relay 3PD. Relay 3PD thereupon releases because both its upper and lower windings are deenergized at this time.

At this point the wiper set of the answering connector has been advanced to a point opposite the required one of the levels of the plurality of terminal sets accessible to the answering connectors. Relay 3PD has been released, and relay 3SD is operated. The answering connector is now in condition to receive a second directive train of impulses.

*Secondary advance of the answering connector.*—The repeated release and reoperation of relay 3CB during the transmission of a second impulse train to the answering connector is effective for completing an energizing circuit for means comprising secondary magnet 2SM upon each release of relay 3CB for advancing the answering connector wiper set in a secondary direction. The circuit is traced from ground through break contacts 3CB2, make contacts 3RD1 and 3SD3, break contacts 3PD2, and the winding of magnet 3SM to battery. Each energization of magnet 3SM is effective for advancing the wiper set of the answering connector one additional step away from its secondary normal position and into engagement with the next succeeding terminal set within the selected level.

The advance of the wiper set away from its normally secondary position is effective for operating secondary off-normal means including various contact spring sets. As a result of the operation of the secondary off-normal means, the above described operating circuit for relay 3SD is opened at break secondary off-normal contacts 3SON1. In order to maintain relay 3SD operated during the transmission of the remainder of the impulse as in the second train, the lower, battery-connected winding of relay 3SD is connected in parallel with magnet 3SM, so that relay 3SD is intermittently energized during the transmission of the remainder of the impulses as in the second train. Relay 3SD is a slow release type, so that it does not release during each momentary deenergization of its lower winding between impulses. Upon the transmission of the final impulse in the train, relay 3CD comes to rest in its operated position, so that the above described energizing circuit for magnet 3SM and the lower winding of relay 3SD is opened at break contacts 3CB2. Magnet 3SM therefore remains deenergized, and relay 3SD then releases after a slight delay. At this point the wiper set has been advanced to engage the required terminal set within the plurality of sets accessible to the answering connectors and calling connectors. As in the case of the above described calling connectors, each terminal set accessible to one of the answering connectors, such as the one shown in Fig. 3, includes first and second talking channel terminals (engaged by wipers such as 3WT and 3WR) and a busy test terminal (engaged by a wiper such as 3WS).

*Busy test and switchthrough of an answering connector*

The foregoing description has set forth how one of the calling connectors, upon selecting an idle terminal set, marks the seized terminal set and the corresponding terminal sets multiply connected thereto in a first manner by applying a 1,000 ohm ground through conductor 2WS to the certain one of the non-talking conductors of the terminal set selected by the calling connector shown in Fig. 2. This signal on the corresponding, multiply connected terminal sets accessible to the answering connectors, indicates to an operated one of the answering connectors that the terminal set is awaiting seizure by an answering connector. If the above described answering connector of Fig. 3 encounters such a condition, switchthrough means within the connector is made operative, so that a talking connection is completed between the incoming conductors of the calling and answering connectors over the talking ones of the terminal sets accessible to both calling and answering connectors. This operation is to be described presently.

If, on the other hand, the operated one of the answering connectors has been advanced to engage a terminal set on which a paging call between a pair of calling and answering connectors is already in progress, the second answering connector is to be prevented from interrupting the already established connection. Accordingly, such a busy condition is indicated by the presence of direct ground on the one of the terminals engaged by wiper 3WS. The ground potential is applied on that terminal in a manner to be described presently by the calling and answering connectors already connected to the terminal set. In order to determine whether or not the engaged terminal set is busy, each answering connector is provided with busy test means comprising relay 3BT immediately operative upon the engagement of the terminal set for detecting the presence of such a ground. The busy test means in operated condition is effective for preventing the operation of the switchthrough means within the answering connector and for applying busy tone to the line extended to that answering connector.

There is a third possible condition of a terminal set upon the selection of the set by an answering connector, and that is this: the terminal set is not then engaged by any one of the calling or answering connectors, so that the operated one of the answering connectors cannot complete a paging call by engaging that particular terminal set. Such a terminal set is unmarked, that is, the one of the set engaged by the wiper corresponding to 3WS has no potential at all standing thereon. In this event it is required that the operation of the switchthrough means within the operated one of the answering connectors be prevented and that busy tone be applied to the one of the lines extended to the operated answering connector. All three of the operations of the answering connector are next described in detail.

*Busy test.*—Assuming first that the selected terminal set has direct ground connected to the busy test terminal of the selected set, that is, the one of the terminals engaged by wiper 3WS, after the transmission of the second directive digit to the answering connector has been completed in the above described manner and before the release of relay 3SD, a circuit is completed between wiper 3SW and the battery-connected winding of busy test relay 3BT. The circuit is traced from wiper 3WS, make contacts 3SD6, and the winding of battery 3BT to battery. The presence of ground on wiper 3WS completes an obvious operating circuit for relay 3BT. Relay 3BT thereupon operates.

The operation of relay 3BT is effective for transferring the calling subscriber line 1L20 from its connection to direct ground through the upper winding of relay 3CB2 into connection with the low impedance busy tone source at break contacts 3BT2 and make contacts 3BT1, respectively. Therefore busy tone is heard on station B connected to calling line 1L20. The operation of relay 3BT is further effective in response to the subsequent release of relay 3SD which takes place in the above described manner for closing a locking circuit for itself from ground through make contacts 3RD2 and 3BT5, break contacts 3SD5, and the winding of relay 3BT to battery. Relay 3BT therefore remains operated so long as relay 3RD is held in operated condition. The operation of relay 3BT is further effective for preventing the switchthrough means comprising switchthrough relay 3SW from operating by opening the operating circuit including the lower winding of relay 3SW at break contacts 3BT6. Upon hearing the busy tone, the calling subscriber at station B returns his telephone to its hookswitch, so that the connection is released in the manner to be described presently.

*Unmarked terminal set.*—Assuming next that the terminal set engaged by the wiper set of the operated answering connector is unmarked and that no potential is present on the terminal engaged by wiper 3WS, relay 3BT fails to operate in the above described manner and relay 3SD subsequently releases. At this time a second circuit for operating the busy test means comprising relay 3BT is completed from ground through make contacts 3RD2 and secondary off-normal contacts 3SON2, rectifier 3RCT, break contacts 3SW1 and 3SD4, thermistor 3TH, break contacts 3SD5, and the winding of relay 3BT to battery. The presence of thermistor 3TH in the operating circuit of relay 3BT is effective for delaying the operation of relay 3BT for a time interval greater than the time required to operate switchthrough relay 3SD, in order to give relay 3SW time to operate in the manner to be described presently. Thus, if a circuit is completed for operating relay 3SW and the above described second operating circuit for relay 3BT are completed at substantially the same time, relay 3SW operates first and is effective for making the busy test means inoperative by opening the second operating circuit of relay 3BT at break contacts 3SW1. Assuming that relay 3BT has operated over the above described second circuit, the operation of the relay is effective in exactly the same manner to apply busy tone to the calling line 1L20 and station B, to complete a locking circuit for itself, and to prevent the subsequent operation of relay 3SW.

*Switchthrough.*—It is next assumed that the wiper set of the answering connector has selected a terminal set on which a 1,000 ohm ground is present on the one of the terminals engaged by wiper 3SW. Upon the completion of the transmission of the second impulse train to the answering connector, such as the one shown in Fig. 3a, and prior to the release of relay 3SD, the above described first operating circuit for relay 3BT is completed at make contacts 3SD6. Under these conditions, the 1,000 ohm ground prevents sufficient current to operate relay 3BT from flowing through the winding of that relay. Accordingly, relay 3BT fails to operate during the time that relay 3SD remains operated. Thereafter relay 3SD releases to complete a circuit for operating the switchthrough means within the connector comprising relay 3SW in response to the slection of a terminal set marked in the aforementioned first manner. The operating circuit of relay 3SW is traced from the marked terminal engaged by wiper 3WS, break contacts 3SD7 and 3BT6, make contacts 3RD5, and the lower winding of relay 3SW to battery. Relay 3SW thereupon operates to the point where make contacts 3SW3 are closed. Contacts 3SW3 in closed condition are effective at this time for completing a circuit for fully operating relay 3SW which is traced from ground through make contacts 3RD2 and 3SW3, and the upper winding of relay 3SW to battery. Relay 3SW thereupon fully operates.

The full operation of relay 3SW is effective for completing a talking channel between the incoming conductors 3T and 3R of the answering connector and the terminals engaged by wipers 3WT and 3WR at make contacts 3SW7 and 3SW8. Blocking capacitors 3C1 and 3C2 in the answering connector prevent signaling current supplied to calling line 1L20 from passing through the multiple connection established over wipers 3WT and 3WR and vice versa. The operation of relay 3SW is also effective for connecting the ground-connected upper winding and battery-connected lower winding of relay 3SR to wipers 3WT and 3WR, respectively, at make contacts 3SW5 and 3SW6, respectively, over an obvious circuit. The operation of relay 3SW is further effective for opening the operating circuit of release magnet 3RM at break contacts 3SW4. The operation of 3SW is further effective for opening the above described operating circuit for relay 3BT at break contacts 3SW1 in order to prevent the operation of relay 3BT at this time. The operation of relay 3SW is further effective for putting direct ground on wiper 3WS and its multiply connected, engaged terminal through make contacts 3RD2 and 3SON2, rectifier 3RCT, and make contacts 3SW2 to wiper 3WS. Application of direct ground to wiper 3WS comprises a signal for marking busy the engaged terminal set and any one of the corresponding terminal sets accessible from other answering and calling connectors.

*Completing a connection between a calling and an answering connector*

At this point a connection has been completed between calling line 1L10 and its station A to the operated one of the calling connectors such as the one shown in Fig. 2 and a connection has been completed between answering line 1L20 and its station B and the talking channel comprising the multiple conductors connected to the ones of the terminal set engaged by wipers 3WT and 3WR of the operated answering connector such as the one shown in Fig. 3. Thus the paging and paged parties at stations A and B, respectively, are now connected to each other. The above described application of ground and battery signals to wipers 3WT2 and 3WR and the multiple conductor talking channel comprises a signal for indicating to the corresponding operated calling connector that the call has been answered. The multiple conductors extending between the terminal sets are connected so that the one of the conductors connected to the terminal engaged by wiper 3WT is connected to the terminal engaged by wiper 2WT, and so that wiper 3WR is similarly connected to wiper 2WR. The application of ground in the above described manner to wipers 3WT and 2WT and the application of battery to wipers 3WR and 2WR is hereinafter referred to as a normal supervisory signal, as compared to a later described reverse supervisory signal.

Referring to the calling connectors shown in Fig. 2, the calling connector includes means comprising normal battery relay 2NB and reverse battery 2RB for detecting normal and reverse, respectively, supervisory signals applied to the paging system talking channel. The windings of relays 2NB and 2RB are connected in series and the combination bridged across the talking channel by break contacts 2SD7 and 2SD8. With this arrangement, the signal detecting means is connected (and therefore made operative) only after secondary delay relay 2SD has released at the end of transmission of the second directive digit to the calling connector in the previously described manner. Current flowing through the windings of relays NB and RB as the result of the application of a supervision signal is sufficient to operate either relay. In order to make relay 2NB only respond to the normal supervisory signal, the winding of relay 2RB is shunted by rectifier 2RCT1 which is poled to short out the winding of relay 2RB when the above described normal supervisory signal is applied to wipers 2WT and 2WR. Similarly, in order to make relay 2RB only respond to a reverse supervisory signal, the winding of relay 2NB is shunted by rectifier 2RCT2 which is poled to short out the winding of relay HB when the above described reverse supervisory signal is applied between wipers 2WT and 2WR.

Returning to the point where a normal supervisory signal is applied between wipers 2WT and 2WR, relay 2NB operates as indicated above. The operation of relay 2NB is effective for opening the previously described operating circuit for start relay 2ST at break contacts 2NB1. Relay 2ST, a slow-release type, releases thereafter. The operation of relay 2NB further is effective before the release of relay 2ST is completed for completing an operating circuit for answering supervisory relay 2AN which is traced from ground through break contacts 2RB2, make contacts 2SW1, 2NB2, and 2ST3, and the winding of relay 2AN to battery. Relay 2AN thereupon operates. The operation of relay 2AN is effective for closing an obvious locking circuit for itself at make contacts 2AN10 which are in parallel with make contacts 2ST3, so that the subsequent release of relay 2ST is not effective for releasing relay 2AN.

The release of relay 2ST is effective for opening the previously described connection of rinkback tone to calling line 1L10 at make contacts 2ST1 in order to inform the paging party at station A that this paging call has been answered. The release of relay 2ST is further effective in the previously described manner for opening the above traced operating circuit for relay 2AN at make contacts 2ST3. The release of relay 2ST is further effective for removing ground from the encoder control start conductor 2ST10 at make contacts 2ST4, so that the encoder control start relay 6ST can release at this time if the Fig. 3 calling connector has been the only one of the first plurality in operated condition and waiting for a paged party to answer. Referring to the encoder control shown in Fig. 6, the release of relay 6ST is effective for placing the encoder control in normal condition, so that it is thereafter free to respond to a demand signal from other operated ones of the calling connectors. In the event that connectors other than the one in Fig. 2 are in operated condition and waiting for a paged party to answer, the release of relay 2ST is effective for removing the marking ground which identifies the calling one of the calling connectors from marking lead 2MK10 at make contacts 2ST5. Thereafter, the rotary switch within the previously described encoder control is not stopped on the terminal set individual to the Fig. 2 connector, so that the encoder control is no longer effective for energizing the signaling terminal selected by the operation of the calling connector. For this reason, the selective control over the previously described encoder control exercised by the Fig. 2 calling connector is stopped when the paged party has answered.

The operation of relay 2AN in the above described manner is effective for reversing the direction of current flow within calling line 1L10 and at calling station A at reversing contacts 2AN1, 2AN2, 2AN3, and 2AN4 in order to further indicate that the call has been answered. The operation of relay 2AN is further effective for completing an operating circuit for answering repeater relay 2ANR at make contacts 2AN7. The latter circuit is traced from ground through make contacts 2RD4 and 2AN7 and the winding of relay 2ANR to battery. Relay 2ANR thereupon operates.

The operation of relay 2ANR is effective for closing an obvious holding circuit for itself at contacts 2ANR1 which are in parallel with contacts 2AN7. The operation of relay 2ANR is further effective for further opening the previously traced operating circuit for start relay 2ST at break contacts 2ANR2. The operation of relay 2ANR is further effective for transferring wiper 2WS from its previously traced connection to the 1,000 ohm ground into connection with direct ground at break contacts 2ANR4 and make contacts 2ANR3. At this point direct ground is supplied to wipers 2WS and 3WS at make contacts 2ANR3 within the calling connector and 3SW2 within the answering connector, so that the busy condition on the terminal sets engaged by the calling and answering connectors of Figs. 2 and 3 is maintained upon the subsequent release of one or the other of the connectors. Both calling and answering connectors remain in the above described conditions until the switch trains through which the connection has been established are released in the manner to be described presently.

*Alarm condition*

Thus far in the description of our system, it has been assumed that the control exercised by the paging party at station A over the calling connector and decoding matrix has been effective to bring about the above described results. However, in the operation of the calling connector and encoder control, it is possible that the equipment will fail to function in the described manner. For instance, upon the application of an energizing signal to the one of the terminals engaged by wiper 2WHS within the calling connector, no relay or more than one relay within any one of the decoding matrices A, B or C might be operated. It is to be recalled that the proper operation of each decoding matrix requires the operation of one and only one relay. The following description of the alarm responsive apparatus is confined to an example of misfunction within the decoding matrix where none or more than one of the decoding relays is operated. However, it is to be understood that the alarm responsive apparatus within the encoder control and individual ones of the connectors may be made to respond to other alarm conditions.

*Misfunction within the decoder control.*—The contact sets on the decoding relays are further arranged so that if two or more relays within each matrix relay are operated or if none of the matrix relays is operated, an alarm indicating conductor 6ALM10 is energized and the start conductor 6SS10 is not energized. Referring to matrix A shown in Fig. 5*a*, in the condition where none of the decoding matrix relays is operated, ground forwarded from the encoder control over conductor 6SY10 in the previously described manner is forwarded over the chain-connected break contacts such as 5MN1, 5MB1, and 5MA1 to alarm conductor 6ALM10. In the condition where more than one relay within matrix A is operated, ground is transmitted from conductor 6SY10 through the left-hand make contacts of a first operated relay in the chain and through the right-hand make contacts in the second operated relay in the chain. Thus, assuming that both relays 5MN, and 5MB are operated within matrix A, ground extended to conductor 6SYE10, in the previously described manner, to alarm indicating conductor 6ALM10 through make contacts 5MN2, the right-hand, chain-connected break contacts of the succeeding matrix relays up to relay 5MB, and make contacts 5MB4 to conductor 6ALM10.

*Forwarding an alarm signal for an operated connector.*—The presence of a ground signal on alarm conductor 6ALM10 is a signal to alarm responsive means within the Fig. 6 encoder control. The operation of alarm responsive means including alarm relay 6AL and alarm repeater relay 6ALR is effective at this time (i.e., when the encoder control rotary switch has advanced its wiper set to engage the terminal set individual to the operated one of the calling connectors demanding service) for forwarding an alarm signal to the identified, operated one of the calling connectors. Alarm means within that connector thereupon is made effective for transmitting a dismiss signal to the encoder control and for notifying the paging party of the failure of the equipment to signal the paged party. Within the encoder control, means for releasing the encoder control from the particular one of the calling connectors is made operative. These operations are next described in detail.

The ground signal on conductor 6ALM10 is forwarded by the encoder control through break contacts 6ALR3, make contacts 6SW9, and wiper 6WAL to the conductors 2AL10 individual to the calling connector demanding service. The presence of ground on conductor 2AL10 is a signal effective for operating alarm relay 2AL over an obvious circuit. The operation of alarm relay 2AL within the calling connector demanding service is effective for closing a locking circuit for itself from ground through break contacts 2RL1 on manually operable release key 2RLK, make contacts 2AL7, and the winding of relay 2AL to battery. Thereafter relay 2AL is maintained operated until a repairman operates key 2RLK.

The operation of relay 2AL is further effective for connecting busy tone from the low impedance busy tone source to the calling line 1L10 by way of the upper winding of relay 2CB at make contacts 2AL2 and for disconnecting the direct ground connected to the upper winding of relay 2CB at break contacts 2AL1. The paging party at station A is thereby notified that the equipment is not capable of signaling the first subsystem receiver of the paged party and that the telephone at station A should be returned to its hookswitch. The operation of relay 2AL is further effective for preparing a circuit including the upper winding of relay 2PD for reoperating that relay upon the release of relay 2RD at make contacts 2AL3. The operation of relay 2AL is further effective for releasing now operated start relay 2ST by opening the previously traced operating circuit at break contacts 2AL4. Relay 2ST thereupon releases with effects which are to be explained presently. The operation of relay 2AL is further effective for preventing the operation of release magnet 2RM by opening the operating circuit for the magnet at break contacts 2AL5. Therefore release magnet 2RM cannot be operated upon the restoration of the calling station telephone to its hookswitch, an event which would otherwise take place in the manner to be explained presently. The operation of relay 2AL is further effective for applying a ground signal at make contacts 2AL6 to the "no further alarm" conductor 2NFA10, which extends from the encoder control to contacts similar such as 2AL6 in all other calling connectors, with effects which are to be explained presently.

Returning to the consideration of relay 2ST, the release of relay 2ST which is delayed owing to its slow release characteristics, is effective for disconnecting ringback tone from the calling line 1L20 by opening the above traced connection at make contacts ST1. Assuming that only the calling connector of Fig. 2 is operated and sending a demand signal to the encoder control of this time, the release of relay 2ST is effective for disconnecting ground from the encoder start conductor 2ST10 at make contacts 2ST4. Similarly, the release of relay 2ST is further effective for removing ground from marking conductor 2MK10 at make contacts 2ST5.

*Forwarding an alarm signal to the common encoder control.*—The application of ground to conductor 2NFA10 and the removal of ground from conductor 2ST10 are effective for operating alarm relay 6AL and releasing start relay 6ST within the encoder control. The encoder control is thereupon in alarm condition. The operation of relay 6AL is effective for preparing a circuit for operating alarm repeater relay 6ALR at make contacts 6AL1. The operation of relay 6AL is further effective for completing the release circuit of relay 6SW from ground through break contacts 6ALR1, make contacts 6AL2 and 6SW6, and the lower winding of relay 6SW to battery. Relay 6SW is thereupon differentially energized in the previously described manner and releases. The operation of relay 6AL is further effective for operating alarm indicating means within the encoder control comprising lamp 6ALL by completing an obvious circuit for energizing alarm lamp 6ALL at make contacts 6AL3.

The release of relay 6SW is effective for closing the prepared operating circuit for alarm repeater relay 6ALR from ground through make contacts 6AL1, break contacts 6SW1, and the winding of relay 6ALR to battery. Relay 6ALR thereupon operates. The release of relay 6SW is also effective in the previously described manner to open the ground connection to conductor 6SY10 at make contacts 6SW2, to release switchthrough repeater relay 6SWR by opening the latter's operating circuit at make contacts 6SW3, to reclose the energizing circuits for rotary magnet 6RM at break contacts 6SW4, to reprepare the operating circuit for relay 6HA at break contacts 6SW5 and to open the deenergizing circuit of relay 6SW10 at break contacts 6SW6 and the holding circuit for relay 6SW at make contacts 6SW7. The release of relay 6SW is further effective for removing ground from wiper 6WHS at make contacts 6SW8, for opening the previously described energizing circuit for the conector alarm relay 2AL at make contacts 6SW9, and for opening the ground connection to conductor 6CL10 at make contacts 6SW10.

*Occurrence of a second alarm condition.*—Upon the operation of relays 6AL and 6ALR and the release of relays 6ST, 6SW, and 6SWR, the encoder control is in condition to receive further demand signals from operated ones of the calling connectors. The encoder control continues to be effective in the previously described manner to energize ones of the terminal sets accessible to the calling connectors. With relays AL and ALR in operated condition, the occurrence of a subsequent alarm condition of the above described type relay 6TD is effective for immediately placing the encoder control in its dismissed condition in order to make the encoder control available to the next subsequent operated one of the calling connectors demanding the services of the encoder control. This operation is next described in detail.

Assuming that relay 6ALR is in the above indicated operated condition, and that a demand signal has been placed on conductor 2ST10 by an operated one of the calling connectors, relay 6ST within the encoder control is again operated so that the rotary switch wipers of the encoder control are advanced into engagement with the demanding one of the plurality of calling connectors. Thereupon relay 6SW is again operated in the previously described manner in order to transmit an energizing signal over conductor 2HS10 to the terminal set selected by the operated connector. The energization of the selected terminal set is effective for transmitting an identity signal to the decoding matrix.

It is assumed that one of the matrices misfunctions and that a ground signal is again placed on alarm conductor 6ALM10 in the previously described manner. At this point the alarm signal, instead of being transmitted to the operated one of the calling connectors demanding service by the encoder control as previously described, is diverted to the winding of relay 6TD at make contacts 6ALR4. Relay 6TD is therefore operated at this time and is effective in the previously described manner for opening the operating circuit for relay 6SS at break contacts 6TD1, for opening the operating circuit of relay 6SW at break contacts 6TD4, for opening the operating circuit for rotary magnet 6RM at break contacts 6TD2 and for completing the release circuit for relay 6SW at make contacts 6TD3.

Thereupon relays 6SS and 6SW are released in the previously described manner in order to make the encoder control responsive to a subsequently received demand signal from an operated one of the calling connectors. Relay 6TD thereafter releases in response to the release of the decoding matrix relays which takes place in the previously described manner and to the opening of the previously traced energizing circuit for alarm conductor 6ALM10. The failure of relay 6SS to operate at this time is effective for withholding the start signal from the encoder transmitter start means and for preventing the operation of the previously described locking circuit for relay 6ST at make contacts 6SS2 and 6SS1, respectively. Therefore, the encoder transmitter is not operated at this time in response to the operation of the misfunctioning decoding matrix.

*Release of the switch trains*

At the completion of a normal paging call or at any time before that, the release of operated ones of the switch trains including operated ones of the calling and answering connectors included in the paging call is normally under the control of the call directing means including the calling stations and lines. Release of the switch trains is initiated in the conventional manner when the party or parties at the calling line station or stations hang up.

*Release of the switch train including the calling connector.*—The return of the telephone to its hookswitch at the station A by the paging party is effective for opening the previously described operating circuit for relay 2CB at the hookswitch contact of the station subset. Relay 2CB thereupon releases, opening the previously described circuit for operating release delay relay 2RD at make contacts 2CB1.

The release of relay 2RD is effective for opening the above traced operating circuits for relays 2PD and 2SD and the previously described locking circuits for any of relays 2BT, 2SW, and 2ANR at make contacts 2RD4. As a result, any operated one of these relays is thereupon released. If relay 2BT has been operated, its release is effective for retransferring the upper winding of relay 2CB from its connection to the busy tone source into connection with direct ground at make contacts 2BT4 and break contacts 2BT3, respectively. If relay 2SW has been operated, its release is effective for opening the above described operating circuit for normal battery relay 2NB and for disconnecting the incoming talking channel conductors of the connector including 2T and 2R from the wiper set at make contacts 2SW3 and 2SW4. Relay 2NB thereupon releases. The release of relay 2SW is further effective for opening the above described operating circuits for relays 2AN and 2ST at make contacts 2SW1. Therefore either of relays 2ST or 2AN which has been operated is thereupon released. If relay 2ANR has been operated, its release is effective for repreparing the operating circuit of relay 2ST at break contacts 2ANR2. The release of relay 2SW is further effective for removing both the direct and resistance ground connection to wipers 2WS at make contacts 2SW5. If relay 2AN has been operated, its release is effective for rereversing the connection of the windings of relay 2CB to incoming conductors 2T and 2R at transfer contacts 2AN1—2AN2 and 2AN3—2AN4.

The release of relay 2RD is effective in response to the previous advance of the wiper set away from its normal position and the consequent operation of the previously described off-normal means for completing a circuit for energizing release magnet 2RM from ground through break contacts 2AL5, 2SW2, and 2RD6, either or both operated, parallel-connected primary and secondary off-normal springs 2PON3 and 2SON2, respectively, and magnet 2RM to battery. The energization of magnet 2RM is effective for restoring the wiper set of the calling connector from its operated position to its primary and secondary off-normal positions. The operation of magnet 2RM is further effective for applying ground to incoming sleeve conductor 2S at make contacts 2RM1 in order to continue to apply busy marking ground to that conductor until the release of the connector has been completed.

The return of the wiper set to its normal position is effective for restoring the previously described off-normal means of the connector to their normal conditions, so that the above traced operating circuit for magnet 2RM is opened at make contacts 2PON3 and 2SON2. Magnet 2RM thereupon releases and removes the busy marking ground from conductor 2S at make contacts 2RM1.

At this point the operated one of the calling connectors has been returned to its normal condition. It is thereafter available for reuse by other parties wishing to place paging calls.

*Attempted release of a calling connector after an alarm condition.*—If, after a paging party has operated one of the calling connectors, such as the one shown in Fig. 3, and the attempt to place the paging call was unsuccessful owing to the occurrence of an alarm condition in the previously described manner, the paging party returns the telephone to its hookswitch at station A. Under these conditions, the switch train up to but not including the operated calling connector is to be released, and the connector is to be maintained in its operated condition until it is manually released in order to help the repairman locate the trouble-causing elements in the system. It is to be recalled that when the calling connector is placed in alarm condition, relays 2CB, 2RD, and 2AL within the calling connector are operated until the calling party hangs up. The hang-up operation of the calling party is effective in the previously described manner for releasing relays 2CB and 2RD.

The release of relay 2RD is effective in the previously described manner for releasing the preceding switch train including elements, such as selector 1S10, by removing ground from incoming sleeve conductor 2S at make contacts 2RD5. However, relay 2AL is maintained in its operated condition through the previously described locking circuit including the break contacts or manually operable key 2RLK. The continued operation of relay 2AL is effective at this time for opening previously described energizing circuit for magnet 2RM at break contacts 2AL5. Therefore, the wiper set of the calling connector is maintained in its operated position.

The operation of relay 2AL is effective in response to the release of relay 2RD for reoperating primary delay relay 2PD over a circuit traced from ground through break contacts 2RD3, make contacts 2AL3 and 2PON1, and the upper winding of relay 2PD to battery. Relay 2PD reoperates and is effective for reapplying busy marking ground to incoming conductor 2S at make contacts 2PD3. The application of ground to conductor 2S is effective for marking the calling connector busy to the switching equipment in the telephone office until relay 2AL is manually released.

After making an inspection of the locked up calling connector, the repairman manually operates key 2RLK in order to open the above traced locking circuit for relay 2AL at break contacts 2RL1. Thereupon relay 2AL releases. The release of relay 2AL is effective for opening the above traced second operating circuit for relay 2PD at make contacts 2AL3. Relay 2PD releases to remove ground from conductor 2S at make contacts 2PD3. The release of relay 2AL is also effective for completing the above traced circuit for energizing magnet 2RM at break contacts 2AL5. The calling connector wiper set is thereupon returned to its normal position and the connector is in normal condition, available to parties wishing to make paging calls.

*Release of the answering connector.*—If, at the conclusion of a successful or unsuccessful attempt to extend a connection from a paged party at a station such as B through one of the answering connectors such as the one shown in Fig. 3, the answering party wishes to discontinue the call, the telephone is returned to its hookswitch at station B, thereby opening the above described operating circuit for relay 3CB at the station hookswitch contacts. Relay 3CB thereupon releases and opens the above described operating circuit for relay 3RD at make contacts 3CB1. Relay 3RD thereafter releases.

The release of relay 3RD is effective for opening the previously described operating circuit for relays 3PD, 3SD, and 3SW and the holding circuits for relay 3BT at make contacts 3RD2. Any operated ones of these relays are thereupon released. If relay 3BT has been operated, its release is effective for retransferring the upper winding of relay 3CB from its connection to the busy tone source to connection with direct ground at make contacts 3BT1 and 3BT2, respectively. If relay 3SW has been operated, its release at this time is effective for disconnecting the incoming talking conductors of the answering connector from the wiper set and for opening the previously traced operating circuit for relay 3SR at make contacts 3SW7 and 3SW8. If relay 3SR has been operated, it is released at this point. The release of relay 3SR is effective for rereversing the connection of relay 3CB windings to incoming conductors 3T and 3R at transfer contacts 3SR2—3SR1 and 3SR3—3SR4.

The release of relays 3RD and 3SW is effective for completing an energizing circuit for release magnet 3RM. The circuit is traced from ground through break contacts 3RD4 and 3SW4, either or both, parallel-connected make contacts 3PON2 and 3SON3, and the winding of magnet 3RM to battery. The energization of magnet 3RM is effective for restoring the wiper set of the answering connector from its operated position to normal position. The energization of magnet 3RM is also effective for applying busy marked ground to incoming sleeve conductor 3S at make contacts 3RM1.

Upon the restoration of the wiper set to its normal position, the previously described primary and secondary off-normal means are also placed in normal condition so that the above described energizing circuit for magnet 3RM is opened at make contacts 3PON2 and 3SON3. Magnet 3RM is thereby deenergized. The deenergization of magnet 3RM is effective for opening contacts 3RM1 in order to remove ground from incoming sleeve conductor 3S. The answering connector is thereupon fully released. It is again available for use by paged parties in making calls.

*Intercept operation*

In the previous description, it has been pointed out how a party, wishing to page, has caused a calling connector such as the one shown in Fig. 2 to be directively operated, with the result that the encoder transmitter is selectively operated to signal the required party at a station in the radio frequency signaling system. It may be desirable in some instances to connect the paging party to an intercept answering device, such as the operator position indicated in Fig. 4*b*, immediately. Examples of calls requiring intercept services occur when the directory number of one of the radio frequency signaling system stations has been changed or discontinued, and when a particular radio frequency signaling system station has been annoyed by persons placing repeated malicious calls to that station. In the first instance, it is desirable to interconnect the calling party and the intercept operator and thereafter allow the calling party to release the switch train including the calling connector by the normal procedure which starts with hanging up the calling telephone. In the second instance, it is desirable to maintain the entire switch train including the calling connector operated after the calling party hangs up in order to allow a repairman to identify the calling line by tracing the call back through the switch train. In order to meet these requirements, we have provided a single intercept termination adapted to our system which is capable of providing both types of intercept service.

An intercept termination shown in Fig. 4*a* is one of a plurality of similar terminations. Each such termination is accessible at a first point to a terminal set to be given changed-number type intercept service by way of conductors such as those shown collectively as 4IL20. The same termination also is accessible at a second point to a terminal set to be given malicious-call type intercept service by way of another set of conductors shown collectively at 4IL10. An operator position termination is provided which is common to the plurality of intercept terminations and used for connecting the operator's telephone to the calling line. A detailed description of the intercept and operator terminations is next provided.

*Malicious call intercept.*—Upon seizure of a terminal set by an operated one of the calling connectors which is connected to the second access point in the intercept termination, a supervisory signal of the reverse type described in connection with the steps involved in completing a connection between a calling and answering connector is applied to wipers 2WT and 2WR of the Fig. 3 calling connector. The reverse supervisory signal is achieved by connecting the battery-connected upper winding and the ground-connected lower winding of start relay 4ST to conductors 4T2 and 4R2 through break contacts 4LO1 and 4LO2, respectively. Within the calling connector, relay 2SW has already operated, so that the reverse supervisory signal is applied to the previously described supervisory signal responsive means including relays 2RB and 2NB within the connector. As previously indicated, relay 2RB is operated in response to the application of the reverse signal to the talking channel of the calling connector, while relay 2NB is not operated. In order to indicate the presence of a call standing in on the intercept termination, start relay 4ST within the termination operates in response to the flow of current through the calling connector supervisory means which includes the winding of relay 2RB.

Within the calling connector, the operation of relay RB2 is effective for opening the previously traced operating circuit for answering relay 2AN at break contacts 2RB2, so that relay 2AN may not thereafter be operated. The operation of relay 2RB is further effective for completing a holding circuit for relay 2RD at make contacts 2RB1 and through make contacts 2RD1 and the winding of relay 2RD to battery. The purpose of this holding circuit is to prevent the release of relay 2RD upon the release of relay 2CB and is further discussed in subsequent paragraphs.

The extension of the connection from the terminal set of a calling connector to the second access point of the intercept termination is further effective for completing a circuit for operating sleeve relay 4SL from ground through resistor 2R3, break contacts 2ANR4, make contacts 2SW5, wiper 2W, incoming sleeve conductor 4S2, resistor 4R3, and the winding of relay 4SL to battery. Relay 4SL thereupon operates and is effective for preparing a holding circuit for lockout relay 4LO at make contacts 4SL1.

Returning to the consideration of the intercept termination shown in Fig. 4*a*, the operation of relay 4ST is effective for applying ringback tone to the calling line through a circuit traced from the ringback tone source through break contacts 4LO3, make contacts 4ST1, break contacts 4PU2, conductor 4R2, and the talking channel of the preceding switch train including the calling connector. The operation of relay 4ST is further effective for completing a circuit for energizing incoming signal means comprising lamp 4IS over a circuit traced from ground through break contacts 4LO5, make contacts 4ST1, break contacts 4PU4, and the filament of lamp 4IS to battery. The operation of relay 4ST is further effective for preparing an operating circuit for pickup relay 4PU at break contacts 4ST3. Relay 4ST also serves as means for gating the calls to the operator position, that is, to render call connecting means comprising relay PU individual to the Fig. 4 termination effective and to make the PU relays in all other terminations inoperative. To this end, all PU relays in the various intercept terminations are made to operate through a circuit including chain-connected contacts on the start relay such as 4ST. The operation of any 4ST relay opens the PU relay operating circuits of all succeeding terminations at break contacts such as 4ST5. At the same time, the operation of the ST relay further prepares the operating circuit of the corresponding PU relay at contacts such as 4ST4.

In response to the energized incoming signal, an operator at the position indicated in Fig. 4*b* responds by extending a connection from her telephone 4TL to the common operator termination by inserting plug 4P into jack 4J over an obvious circuit. Insertion of the plug into the jack also completes an equally obvious circuit for operating relay 4SA.

The operation of relay 4SA is effective in response to the operation of gating means individual to one of the terminations such as relay 4ST for completing an operating circuit for the corresponding pickup relay such as 4PU. The circuit is traced from ground through break contacts 4SB3, make contacts 4SA2 and 4ST4, break contacts 4PU5 and 4LO6, make contacts 4ST3, and the winding of relay 4PU to battery. Relay 4PU thereupon operates. The operation of relays 4SA and 4PU is further effective for completing a holding circuit for relay 4PU from battery through the winding of relay 4PU, make contacts 4ST3, break contacts 4LO6, make contacts 4PU6, and the parallel-connected make contacts 4SA3 and 4SB2 to ground. The operation of relay 4SA is further effective for opening an operating circuit for lockout relay 4LO at break contacts 4SA4. The operation of relay 4SA is further effective for completing an obvious operating circuit for relay 4SB. Relay 4SB thereupon operates.

The operation of relay 4SB is effective for preparing an operating circuit for relay 4LO at make contacts 4SB1. The operation of relay 4SB is further effective for preparing an alternate circuit for holding relay 4PU at make contacts 4SB2. The operation of relay 4SB is further effective for opening the above traced operating circuit for relay 4PU at break contacts 4SB3.

The operation of relay 4PU is further effective for disconnecting the above traced ringback tone connection from the calling line at break contacts 4PU2. The operation of relay 4PU is further effective for completing the connection extended from the calling line through the operated one of the calling connectors and the operator position at make contacts 4PU1 and 4PU3. The operation of relay 4PU is further effective for opening the above traced energizing circuit for lamp 4IS at break contacts 4PU4. The lamp is thereupon extinguished and remains extinguished throughout the remainder of the call. The operation of relay 4PU is further effective for opening the above traced operating circuit for itself at break contacts 4PU5. The operation of relay 4PU is further effective for preparing an operating circuit for lockout relay 4LO at make contacts 4PU7.

At this point the station A on the calling line such as 1L10 is connected to the intercept operator position. The intercept operator may thereupon monitor the connection. After monitoring the established connection, the operator may continue to hold the connection by leaving plug 4P in jack 4J until the connection has been traced. If the paging party hangs up during this interval, only the calling bridge relay, such as 2CB, within the calling connector is released. The switch train, including the calling connector, is maintained operated until released by the operator.

The operator withdraws from the monitoring connection by disconnecting her telephone from the intercept termination shown in Fig. 4*b* and thereby causing the operating circuit for relay 4SA to be opened. Relay 4SA thereupon releases, opening the operating circuit of relay 4SB at make contacts 4SA1. Relay 4SB, a slow release type, releases at some time thereafter.

The slow release characteristics of relay 4SB insure that the above traced operating circuit of relay 4PU remains opened at break contacts 4SB3 until relay 4SA is completely released and the operating circuit for relay 4PU further opened at make contacts 4SA2. During the time that relay 4SB is still operated and relay 4SA is released, a disconnect signal is transmitted to the intercept termination shown in Fig. 4*a* and is effective for completing an operating circuit for lockout relay 4LO. The circuit is traced from ground through break contacts 4SA4, make contacts 4SB1 and 4PU7, break contacts 4LO8, and the winding of relay 4LO to battery. Relay 4LO thereupon operates.

The operation of relay 4LO is effective for completing a holding circuit for itself from ground through make contacts 4SL1 and 4LO7 and the winding of relay 4LO to battery. Relay 4LO is therefore held operated under the control of relay 4SL, which in turn is held operated under the control of ground applied to incoming sleeve relay 4S2 from either calling or answering connectors. The operation of relay 4LO is effective for removing the reverse signal from the supervisory signal detecting means within the operated ones of the calling connectors by disconnecting the upper and lower windings of relay 4ST from conductors 4T2 and 4R1, respectively, at break contacts 4LO1 and 4LO2, respectively. Relay 4ST thereupon releases.

The operation of relay 4LO is further effective for opening the above traced energizing circuit for lamp 4IS at break contacts 4LO5 in order to prevent lamp 4IS from being reenergized from this termination during the time that a calling or answering connector is being held on the terminal set individual to the intercept termination. The operation of relay 4LO is further effective for opening the above traced holding circuit for relay 4PU at break contacts 4LO6. Relay 4PU thereupon releases to disconnect the operator termination from the monitored connection at make contacts 4PU1 and 4PU3.

The release of relay 4ST is effective for reclosing the chain contacts for operating the pickup relays in any of the plurality of intercept terminations at break contacts 4ST5. Thereafter the operation of any start relay corresponding to relay 4ST in any of the other of the intercept terminations is effective for completing a circuit for the corresponding pickup relay.

Returning to the consideration of the incoming connector, after the removal of the reverse signal, relay 2RB is released. The release of relay 2RB is effective for repreparing the previously traced operating circuit for relay 2AN at break contacts 2RB2 and for removing the holding ground from the winding of relay 2RD at make contacts 2RB1. Thereafter the intercept call proceeds in the previously described manner.

Assuming however that the operator does not choose to withdraw from the connection and wishes to maintain the preceding switch train including the operated ones of the incoming connectors in its off-normal position so that the identity of the calling line may be traced, the continued operation of relay 4SA prevents the closure of the operating circuit for relay 4LO. Consequently, the reverse signal continues to be transmitted to the operated one of the calling connectors extended to the Fig. 4*a* intercept termination. As a result relay 2RB is maintained in its operated condition in order to hold relay 2RD operated. If during the time that relay 2RD is being held operated under the control of relay 2RD, the party at the calling station returns the telephone to the hookswitch of the calling station in order to release relays 2CB, the release of relay 2CB is without effect because the previously traced release magnet operating circuit within the connector is held open at break contacts 2RD6. Only after the intercept operator withdraws from the connection with the above described results, namely the release of relay RB2, is relay 2RD released and the calling connector released in the normal manner.

*Changed number call intercept.*—Upon the extension of a connection from the operated one of the calling connectors to first termination access point over incoming conductors 4T1 and 4R1 of the intercept termination, a circuit is completed for supplying a normal signal of the previously described type to the signal responsive means within the operated calling connector through the battery-connected upper winding and ground-connected lower winding of relay 4ST. Relay 4ST thereupon operates in the previously described manner. Thereafter the call to the intercept operator proceeds as described above, except that relay 4SL is not operated on this type of call, up to the point where the operator withdraws from the connection. During the time that the operator's telephone is connected to the calling connector, the application of a normal signal to the talking channel of the connector is effective in the previously described manner for operating relay 2NB. Therefore the connector operates in the manner described in connection with answering a call placed to a normal terminal set.

Assuming that the party at the calling station returns his telephone to its hookswitch at station A before the operator pulls down from the intercept connection, the Fig. 2 calling connector is released in the previously described manner in order to open the above described operating circuit for relay 4ST. The release of relay 4ST in turn opens the above traced operating and holding circuit for relay 4PU at make contacts 4ST3. Relay 4PU thereupon releases. The release of relay 4ST is further effective for reestablishing the above described chain contacts for operating the pickup relays in the succeeding ones of the intercept terminations at break contacts 4ST5. Thereafter the intercept operator termination is free to be connected to the next of the intercept terminations having an incoming signal standing thereon. The operator may thereafter withdraw from connection to release relays 4SA and 4SB in the previously described manner.

Assuming that the operator chooses to pull down from the connection before the party at the calling station returns his telephone to its hookswitch contacts, the above traced operating circuit for lockout relay 4LO is again completed in the previously described manner. However the locking circuit for relay 4LO is not completed at make contacts 4SL1, because relay 4SL is not operated at this time. The operation of relay 4LO is effective in the previously described manner for releasing relay 4PU in order to disconnect the operator's termination from the connection and for holding the energizing circuits for lamp 4IS open at break contacts 4LO5. Thereafter the hang-up operation carried out by the calling subscriber is effective in the previously described manner to release the operated one of the calling connectors, thereby opening the above traced operating circuit for relay 4ST. Relay 4ST releases and the intercept termination is again in normal condition and ready to receive further incoming calls.

While we have shown and described the preferred embodiment of our invention, other modifications will readily occur to those skilled in the telephone art. We therefore aim in the appended claims to cover all such modifications as fall within the true spirit and scope of our invention.

What we claim is:

1. In a communication system, a plurality of lines, first and second connectors, first and second pluralities of terminal sets connected in multiple with each other accessible from said first and second connectors respectively, means for extending connections from first and second calling ones of said lines to said first and said second connectors, respectively, each of said connectors being thereafter directively operative under the control of the corresponding calling ones of said lines for further extending connections from the corresponding calling one of said lines to particular, multiply connected ones of said terminal sets, whereby a communication channel may be established between the pairs of calling ones of said lines, and having in addition means in said first connector for placing a marking signal on the selected one of said terminal sets and the one of said terminal sets multiply connected thereto, and switchthrough means in said second connector operative within a finite time interval in response to the presence of a marking signal on the selected one of said terminals for completing a connection from said second connector to the selected one of said terminal sets, whereby a connection may be extended from the second calling one of said lines to a selected terminal set only after that terminal set has been marked by said first connector.

2. The system set forth in claim 1 wherein said second connector also includes busy test means operative within a time interval substantially longer than the said finite time interval in response to the selection of one of said terminal sets, said busy test means being operative for making said switchthrough means inoperative, said switchthrough means in the operated condition also being effective for making said busy test means inoperative, whereby said second calling line is prevented from completing a connection to an unmarked one of said terminal sets and to one of said terminal sets marked subsequent to its selection by said second connector.

3. The system set forth in claim 2 and having in addition a source of tone, said actuating means in the operated condition being effective for connecting said tone source to the calling one of said lines extended to said second connector, whereby busy tone is connected to the second one of said calling lines upon the selection of an unmarked terminal set by said second connector.

4. In a communication system, a plurality of lines, first and second connectors, first and second pluralities of terminal sets connected in multiple with each other accessible from said first and said second connectors respectively, each of said terminal sets comprising talking channel terminals and a busy test terminal, means for extending connections from first and second calling ones of said lines to said first and said second connectors respectively, each of said connectors being thereafter directively operative under the control of the corresponding calling one of said lines for selecting a particular one of said terminal sets, means in said first connector operative in response to the selection of a terminal set for completing a connection from the first calling one of said lines through said first connector to said talking channel terminals of the selected one of said sets and for placing a first marking signal on said busy test terminal of the selected one of said sets and the corresponding busy test terminal in the set multiply connected thereto, switchthrough means in said second connector operative within a finite time interval in response to the selection of any one of said terminal sets and to the presence of a marking signal on the busy test terminal in the selected one of said sets for completing a connection from the second calling one of said lines to said talking channel terminals of said selected set, said second connector including busy test means operative in a time interval substantially longer than said finite time interval in response to the selection of one of said terminal sets for making said switchthrough means inoperative, said switchthrough means in the operated condition also being effective for making said busy test means inoperative, whereby said second calling line is prevented from completing a connection to an unmarked terminal set and to a terminal set marked subsequent to its selection by said second connector.

5. The system set forth in claim 4 and having in addition a busy tone source and wherein said second connector includes means operative in response to the operation of said busy test means for connecting said tone source to said second one of said calling lines, whereby busy tone is connected to the second one of said calling lines upon the selection of an unmarked terminal set by said second connector.

6. In a communication system, a plurality of connectors, a plurality of terminal sets accessible to each of said connectors, each of said terminal sets being multiply connected to corresponding ones of said terminal sets in all others of said pluralities, means for directively causing any one of said connectors to select any one of said terminal sets, switchthrough means within each of said connectors operative in response to the selection of an idle one of said terminal sets for marking the selected one of said sets in a first manner and for extending a connection from the corresponding one of said connectors to the selected one of said terminal sets, means for transmitting a supervisory signal from a selected one of said terminal sets to the operated one of said connectors connected thereto, means within each of said connectors operative in response to the transmission of a supervisory signal from a selected one of said terminal sets and to the operation of said switchthrough means for marking the selected one of said terminal sets in a second manner, and busy test means in each of said connectors operative in response to the selection of one of said terminal sets marked in the first or second manner for preventing the operation of said switchthrough means, whereby a connection to a terminal set marked in either manner by a first of said connectors cannot be established from a second of said connectors.

7. The system set forth in claim 6 wherein each of said connectors includes a talking channel, and each of said terminal sets includes talking channel terminals and a busy test terminal, said switchthrough means within each of said connectors being effective for extending a connection from the corresponding one of said talking channels to said talking channel terminals of the selected one of said sets and for marking said busy test terminal of the selected one of said sets in the first manner, and said supervisory signal responsive means within each of said connectors is effective for marking said busy test terminal of the selected one of said sets in the second manner.

8. The system set forth in claim 7 wherein said switchthrough means is operative for placing resistance ground on said busy test terminal of the selected one of said sets in order to mark the selected one of said sets in the first manner, and said supervisory signal responsive means is effective for placing direct ground on said busy test terminal of the selected one of said sets in order to mark the selected one of said sets in a second manner, and said busy test means in each of said connectors being operative in response to the presence of resistance ground and direct ground on said busy test terminal of the selected one of said sets.

9. In a communication system, a plurality of lines, a plurality of connectors of first class, a plurality of connectors of second class, a plurality of terminal sets individually accessible to each of said connectors, each of said terminal sets of each plurality being connected in multiple to the corresponding one of said terminal sets in all others of said pluralities, a first switch train including any one of said first class connectors for directively extending a connection from a first one of said lines to a particular one of said terminal sets and a second switch train including any one of said second class of connectors for directively extending a connection from a second one of said lines to a particular terminal set within the corresponding said plurality of said terminal sets, whereby private communication channels may be established between pairs of said lines which have been extended to corresponding terminal sets accessible from ones of said first and said second class of connectors, and having in addition means in each of said first class connectors operative in response to the selection of an idle one of said terminal sets for marking the selected one of said terminal sets and the ones of said terminal sets connected multiply thereto in a first manner, switchthrough means within each of said second class of connectors operative within a finite time interval in response to the selection of a terminal set marked in the first manner for transmitting a supervisory signal to the one of said first connectors extended to one of the corresponding, multiply connected terminal sets, means in each of said first class connectors operative in response to the receipt of a supervisory signal from one of said second class connectors for placing a second marking condition on the selected one of said terminal sets, and means in each of said first class connectors operative in response to the selection of one of said terminal sets marked in the first or second manner for preventing the operation of said switchthrough means within the one of said connectors, whereby one of said first class connectors may not be made to extend a connection from one of said terminal sets multiply connected to a terminal set already selected by another of said first class connectors.

10. The system set forth in claim 9 and having in addition means in each of said second class connectors for placing the selected one of said terminal sets and the others of said terminal sets connected thereto in the second marked condition, whereby one of said first class connectors may not be made to extend a connection to one of said terminal sets corresponding to terminal sets previously selected by ones of said first and said second class connectors and which has been released by the operated one of said first class connectors.

11. The system set forth in claim 9 wherein each of said second class connectors includes busy test means operative within a time interval substantially greater than said finite time interval required to operate said switchthrough means in response to the unoperated condition of the corresponding one of said switchthrough means for thereafter preventing the operation of said switchthrough means, whereby one of said second connectors may not be made to extend a connection to an idle one of said terminal sets.

12. The system set forth in claim 9 wherein each of said second class connectors busy test means is also operative in response to the unoperated condition of the corresponding one of said switchthrough means and to the selection of one of said terminal sets marked in the second manner for thereafter preventing the operation of the corresponding one of said switchthrough means, whereby one of said second connectors may not be made to extend a connection to one of said terminal sets corresponding to terminal sets already selected by ones of said first and said second class connectors.

13. The system set forth in claim 9, wherein each of said second class connector switchthrough means is operative for marking the selected one of said terminal sets and the others of said terminal sets connected thereto in the second manner, and wherein each of said second class connectors has busy test means operative within a time interval substantially greater than said finite time interval of the corresponding one of said second class connector switchthrough means for preventing the operation of that switchthrough means in order to prevent any one of said second class connectors from extending a connection to an unmarked one of said terminal sets, said busy test means also being operative in response to the unoperated condition of the corresponding one of said second class connector switchthrough means and to the presence of the second marking condition on the selected one of said terminal sets in order to prevent any one of said second connectors from completing a connection to one of said terminal sets corresponding to terminal sets already selected by others of said first and said second class connectors.

14. In a communication system having a first subsystem comprising a plurality of stations, and transmitting means operative for selectively signaling any one of said stations; and a second subsystem having a plurality of terminal sets, a plurality of connectors, and calling means for directively operating any one of said connectors; each of said terminal sets within each plurality being connected in multiple to the corresponding ones of said terminal sets in the others of said pluralities, each of said connectors having access to a corresponding one of said terminal set pluralities and being directively operable for selecting any one of said terminal sets, and common control means operative in response to the operation of any of said connectors to hunt for and find an operating connector and then applying an energizing signal through the found connector to one of the terminals within the terminal set selected thereby for selectively operating said first subsystem transmitting means, whereby any one of said first subsystem stations may be selectively signaled from any one of said second subsystem calling means.

15. The system defined in claim 14, wherein said transmitting means is operative through a cycle of operations in response to said energization signal and includes means operative at the end of each cycle of operations for transmitting an end-of-cycle signal to said common control means, and wherein said common control means includes ring-connected means operative to hunt for operated ones of said connectors in successive order, and means responsive to the receipt of an end-of-cycle signal for removing said energization signal and for rendering said ring-connected means operative to hunt for and find the next successive operated connector, whereby the continued seizure of a particular terminal set by one of said connectors causes the periodic operation of said transmitting means in response thereto.

16. The system defined in claim 15, wherein said ring-connected means comprises a rotary switch.

17. In a communication system having a first subsystem comprising a plurality of stations and transmitting means operative for selectively signaling any one of said stations; and a second subsystem comprising a plurality of multiply connected terminal sets, a corresponding plurality of connectors, and means for directively operating any one of said connectors to select any one of said terminal sets; means including particular ones of each of said terminal sets for selectively operating said first subsystem transmitting means, and means within said first subsystem operative in response to the malfunction of said transmitting means for making a selected one of said terminal sets ineffective with respect to said transmitter, whereby selective operation of said transmitter is prevented in the event of its malfunction.

18. In a communication system having a first subsystem comprising a plurality of stations and transmitting means for selectively signaling any one of said stations; and a second subsystem comprising plurality of multiply connected terminal sets, a corresponding plurality of connectors, and means for directively operating any one of said connectors to select any one of said terminal sets; means including particular ones of each of said terminal sets for selectively operating said first system transmitting means, start means common to said plurality of connectors operative in response to the operation of any one of said connectors for energizing said particular ones of a selected one of said terminal sets, and alarm means within said first subsystem operative in response to the malfunction of said transmitting means for making said start means ineffective with respect to an energized one of said particular terminals within a selected one of said sets.

19. The communication system set forth in claim 18 wherein each of said connectors includes means for extending a first connection from said common start means to said particular terminals within one of said sets selected by the corresponding one of said connectors, said start means is effective for energizing said particular ones of a selected one of said terminal sets over a connection so extended, means for extending connections from said alarm means to the operated ones of said connectors, and means operative in response to the receipt of an alarm signal from said first system alarm means for making the corresponding one of said first connection extending means inoperative, and said first subsystem alarm means is effective for applying a signal to a connection extended from said alarm means to said alarm responsive means in any one of said connectors.

20. The communication system set forth in claim 19 wherein means in said common control is operative for extending a connection from said first subsystem alarm means to said alarm responsive means within the operated one of said connectors currently connected to said common control.

21. The communication system set forth in claim 20 wherein said common control also includes end-of-cycle means operative in response to the operation of said alarm signal responsive means of any one of said connectors for further opening within said common control a connection extended between said first subsystem alarm means to said alarm responsive means within the operated one of said connectors currently connected to said common control.

22. The communication system set forth in claim 21 wherein said end-of-cycle means is further operative for opening a connection extended through any one of said connectors to said particular terminal of the one of sets selected by the corresponding one of said connectors.

23. The communication system set forth in claim 22 wherein said end-of-cycle means is further operative for sending an end-of-cycle signal to said first subsystem and having in addition means within said first subsystem operative in response to the receipt of a signal from said end-of-cycle means for making said transmitting means inoperative.

24. In a communication system having a first subsystem comprising a plurality of stations and transmit means for selectively signaling any one of said stations; and a second subsystem comprising a plurality of multiply connected terminal sets, a corresponding plurality of connectors, and means for directively operating any one of said connectors to select any one of said terminal sets, means including particular ones of each of said terminal sets for selectively operating said first subsystem transmitting means, start means common to said plurality of connectors operative in response to the operation of any one of said connectors for energizing said particular one of a selected one of said terminal sets, means within each of said connectors normally controlled by said directive operating means for releasing the corresponding one of said connectors from its operated condition, and alarm means within said first subsystem operative in response to the malfunction of said transmitting means for making said start means ineffective with respect to an energized one of said particular terminals within a selected one of said sets, and means within each of said connectors operative in response to the operation of said alarm means for making the corresponding one of said releasing means inoperative.

25. The communication system set forth in claim 24 wherein said means for directively operating said connectors include a switch train and a calling line, said switch train and each of said connectors being directively operated under the control of said calling line, releasing means within said switch train, second means in each of said connectors for operating said switch train releasing means, each of said connector releasing means being normally under the control of said calling line and normally effective for operating said second means, said alarm responsive means in each of said connectors also being operative for making the corresponding one of said second releasing means effective.

26. In a telephone system, a switch train including a connector, a plurality of terminal sets accessible to said connector, apparatus connected to each of said terminal sets, means for directively operating said switch train to cause said connector to select any one of said terminal sets in order to extend a connection normally over said switch train to said apparatus connected to said terminal sets, means in said connector normally under the control of said switch train operating means for releasing said switch train including said connector, means in said connector for transmitting supervisory signals to said switch train, an intercept answering device, means comprising an intercept termination for diverting connections from said apparatus connected to certain of said terminal sets into connection with said intercept answering device, said intercept termination having first and second access points connected to first and second particular ones of said terminal sets, means operative in response to the completion of a connection between said connector and said intercept answering device for transmitting first and second answering supervisory signals to said connector over said first and said second access points, respectively, and first and second supervisory signal responsive means within said connector responsive to first and second supervisory signals received from selected ones of said terminal sets for operating said connector supervisory signal transmitting means and for making said releasing means inoperative, respectively.

27. The telephone system set forth in claim 26 and having in addition means at said answering device for opening a connection between said intercept answering device and said intercept termination, means in said intercept answering device operative in response to the operation of said connection opening means for transmitting a disconnect signal to said intercept termination, and lockout means in said termination operative in response to the receipt of a disconnect signal from said intercept answering device for making said signal transmitting means in said intercept answering device inoperative to send a signal over said second access point.

28. The telephone system set forth in claim 27 wherein said intercept answering termination includes means for holding said lockout means in operated condition, and having in addition means within said connector operative in response to the extension of a connection from said switch train to said second access point for holding said lockout means in operated condition.

29. The telephone system set forth in claim 28 wherein said connector also includes means for energizing selected ones of said terminal sets, and said first supervisory signal responsive means within said connector is effective for making said terminal set energizing means inoperative.

References Cited in the file of this patent

UNITED STATES PATENTS

| | | |
|---|---|---|
| 2,496,629 | Lamberty et al. | Feb. 7, 1950 |
| 2,499,475 | Ericsson et al. | Mar. 7, 1950 |
| 2,584,210 | Xessler | Feb. 5, 1952 |
| 2,717,923 | Pharis | Sept. 13, 1955 |
| 2,722,566 | Peterson | Nov. 1, 1955 |